United States Patent
Szendel et al.

(10) Patent No.: US 9,539,501 B2
(45) Date of Patent: Jan. 10, 2017

(54) SYSTEM FOR IMPLEMENTING INTERNET-BASED GAMES WITH A CORE PLATFORM, GAME MODULES, AND PROTECTED GAME OUTCOME GENERATOR

(71) Applicant: Scientific Games International, Inc., Newark, DE (US)

(72) Inventors: James Allan Szendel, Bethlehem, GA (US); Steven Wayne Beason, Atlanta, GA (US); Kenneth Earl Irwin, Jr., Dawsonville, GA (US); Kirt William Pulaski, Suwanee, GA (US); John Patrick Toohey, Boca Raton, FL (US)

(73) Assignee: Scientific Games International, Inc., Newark, DE (US)

( * ) Notice: Subject to any disclaimer, the term of this patent is extended or adjusted under 35 U.S.C. 154(b) by 391 days.

(21) Appl. No.: 14/050,640

(22) Filed: Oct. 10, 2013

(65) Prior Publication Data

US 2014/0141861 A1 May 22, 2014

Related U.S. Application Data

(60) Provisional application No. 61/712,484, filed on Oct. 11, 2012.

(51) Int. Cl.
*A63F 13/12* (2006.01)
*A63F 13/30* (2014.01)
*G07F 17/32* (2006.01)

(52) U.S. Cl.
CPC .......... *A63F 13/12* (2013.01); *G07F 17/3223* (2013.01); *G07F 17/3241* (2013.01)

(58) Field of Classification Search
CPC .............................. A63F 13/12; G07F 17/3241
USPC ........................................................... 463/22
See application file for complete search history.

(56) References Cited

U.S. PATENT DOCUMENTS

| | | | | |
|---|---|---|---|---|
| 6,030,288 A | * | 2/2000 | Davis | G06Q 40/025 463/29 |
| 6,099,408 A | * | 8/2000 | Schneier | A63F 13/12 463/16 |
| 6,352,479 B1 | * | 3/2002 | Sparks, II | A63F 13/12 463/29 |

(Continued)

OTHER PUBLICATIONS

PCT Search Report, May 19, 2014.

*Primary Examiner* — David L Lewis
*Assistant Examiner* — Shauna-Kay Hall
(74) *Attorney, Agent, or Firm* — Dority & Manning, P.A.

(57) ABSTRACT

An internet gaming system includes a core platform, and a vertical extension functionality configured with the core platform and having a first application programming interface. A plurality of game specific modules are provided with a hardware and software configuration to conduct different respective Internet-based games with players via an Internet lottery site, with each game specific module including a dedicated second application programming interface. Input/output data between the core platform and the game specific modules occurs only through the first and second application programming interfaces. A secure game outcome generator has a hardware and software configuration to determine a game outcome for each game played via the system and is linked to the core platform via a secure interface with the vertical extension.

13 Claims, 19 Drawing Sheets

(56) References Cited

U.S. PATENT DOCUMENTS

| | | | |
|---|---|---|---|
| 7,452,278 B2* | 11/2008 | Chen | A63F 13/12 |
| | | | 463/29 |
| 8,083,591 B2* | 12/2011 | Fulton | G07F 17/32 |
| | | | 463/42 |
| 8,271,382 B2 | 9/2012 | Seifert et al. | |
| 8,282,468 B2 | 10/2012 | Huntley et al. | |
| 8,342,396 B2 | 1/2013 | Couper et al. | |
| 8,352,370 B1 | 1/2013 | White et al. | |
| 8,612,341 B2 | 12/2013 | Sullivan | |
| 8,613,652 B2 | 12/2013 | Stanek et al. | |
| 8,622,806 B2 | 1/2014 | Kelly et al. | |
| 2003/0228910 A1* | 12/2003 | Jawaharlal | G07F 17/32 |
| | | | 463/42 |
| 2004/0038740 A1* | 2/2004 | Muir | A63F 13/10 |
| | | | 463/40 |
| 2004/0204222 A1* | 10/2004 | Roberts | A63F 3/0665 |
| | | | 463/17 |
| 2004/0224771 A1 | 11/2004 | Chen et al. | |
| 2004/0229699 A1 | 11/2004 | Gentles et al. | |
| 2004/0259640 A1* | 12/2004 | Gentles | H04L 67/38 |
| | | | 463/42 |
| 2007/0129144 A1* | 6/2007 | Katz | G07F 17/32 |
| | | | 463/30 |
| 2007/0173322 A1 | 7/2007 | Swamy et al. | |
| 2007/0202941 A1* | 8/2007 | Miltenberger | G07F 17/32 |
| | | | 463/25 |
| 2008/0188311 A1* | 8/2008 | Topham | G06Q 50/34 |
| | | | 463/42 |
| 2008/0287188 A1* | 11/2008 | Riera Jorba | A63F 9/24 |
| | | | 463/29 |
| 2010/0087255 A1* | 4/2010 | Kniberg | G07F 17/3239 |
| | | | 463/42 |
| 2011/0105213 A1* | 5/2011 | Irwin, Jr. | G07F 17/32 |
| | | | 463/17 |
| 2011/0136577 A1* | 6/2011 | Dietz | A63F 13/12 |
| | | | 463/43 |
| 2012/0202571 A1 | 8/2012 | Stanek et al. | |
| 2012/0214570 A1 | 8/2012 | Oakes et al. | |
| 2012/0270628 A1 | 10/2012 | Crucs | |
| 2013/0040738 A1 | 2/2013 | Mikkelsen et al. | |
| 2013/0184079 A1* | 7/2013 | Costello | A63F 9/24 |
| | | | 463/42 |

* cited by examiner

276

275

277

| $20 | RETAIL COST | 3.25 | OVERALL ODDS OF WINNING (1:n) |
|---|---|---|---|
| | | 1,000,000 | TOTAL TICKET QUANTITY |
| 65% | PRIZE FUND PERCENTAGE | $13,000,000 | PRIZE FUND |

| PRIZE STRUCTURE | | | | |
|---|---|---|---|---|
| WIN | % WINNERS | WINNERS PER GAME | PRIZE VALUE | ODDS 1 IN: |
| $3 | 8.0000% | 80,000 | $240,000 | 12.50 |
| $6 | 7.0000% | 70,000 | $420,000 | 14.29 |
| $10 | 5.0000% | 50,000 | $500,000 | 20 |
| $20 | 3.0000% | 30,000 | $600,000 | 33 |
| $30 | 2.0000% | 20,000 | $600,000 | 50 |
| $36 | 1.5000% | 15,000 | $540,000 | 67 |
| $50 | 1.0000% | 10,000 | $500,000 | 100 |
| $100 | 0.9000% | 9,000 | $900,000 | 111 |
| $150 | 0.8000% | 8,000 | $1,200,000 | 125 |
| $200 | 0.7000% | 7,000 | $1,400,000 | 143 |
| $250 | 0.6000% | 6,000 | $1,500,000 | 167 |
| $1,000 | 0.2100% | 2,100 | $2,100,000 | 476 |
| $2,500 | 0.0800% | 800 | $2,000,000 | 1,250 |
| $50,000 | 0.0010% | 10 | $500,000 | 100,000 |
| | | | | |
| | 30.7910% | 307,910 | $13,000,000 | 3.25 |

```
<ticket><gamenumber>0001</gamenumber><sequence>0003601000</sequence><validation>
139349142</validation><data><decryptedTicketData><PrizeLevel>00<PrizeLevel><val
ue><games><game
id="1"><info><PricePoint>15</PricePoint><tickteId>00010002401000</TicketId><game
Desc    gameId="0001"    version="1.0.0"    client="EIT"><prize    type="cash"
currency="USD">00005</prize../gameDesc></info><container        id="01"><item
id="01">19</item><item     id="02">06</item><item     id="03">01</item><item
id="04">02</item><item     id="05">24</item><item     id="06">05</item><item
id="07">16</item><item     id="08">04</item><item     id="06">08</item><item
id="10">23</item><item     id="11">09</item><item     id="12">20</item><item
id="13">07</item><item     id="14">22</item><item     id="15">03</item><item
id="16">14</item><item                                 id="17">11</item><item
id="18">10</item></container><container id="02"><item id="01">04</item><item
id="02">16</item><item     id="03">05</item><item     id="04">07</item><item
id="05">17</item><prize          type="cash"                 currency="USD"
win="0">10000</prize></container><container id="03"><item id="01">06</item><item
id="02">23</item><item     id="03">01</item><item     id="04">24</item><item
id="05">12</item><prize          type="cash"                 currency="USD"
win="0">5000</prize></container><container   id="04"><item  id="01">09</item><item
id="02">08</item><item     id="03">22</item><item     id="04">17</item><prize
type="cash"         currency="USD"         win="0">500</prize></container><container
id="05"><item          id="01">11</item><item         id="02">22</item><item
id="03">18</item><prize          type="cash"                 currency="USD"
win="0">10</prize></container><container    id="06"><item   id="01">14</item><item
id="02">03</item><item     id="03">16</item><item     id="04">20</item><item
id="05">15</item><prize          type="cash"                 currency="USD"
win="0">1000</prize></container><container id="07"><item id="01">11</item><item
id="02">02</item><item     id="03">24</item><item     id="04">12</item><item
type="cash"         currency="USD"        win="0">100</prize></container><container
id="08"><item          id="01">06</item><item         id="02">02</item><item
id="03">19</item><item             type="cash"              currency="USD"
win="1">5</prize></container></game></games></value></decryptedTicketData></data
></ticket>
```

SYSTEM FOR IMPLEMENTING INTERNET-BASED GAMES WITH A CORE PLATFORM, GAME MODULES, AND PROTECTED GAME OUTCOME GENERATOR

RELATED APPLICATIONS

The present application claims priority to U.S. Provisional Application Ser. No. 61/712,484 filed on Oct. 11, 2012, the entire disclosure of which is incorporated herein by reference in its entirety for all purposes.

FIELD OF THE INVENTION

The subject matter of the present application relates to systems and methods for increasing the security, functionality, auditability, and velocity of payment of Internet games to enable configurations of deterministic, random, and player alterable Internet games.

BACKGROUND

Lottery games have become a time honored method of raising revenue for state and federal governments the world over. Traditional scratch-off and on-line games have evolved over decades, supplying increasing revenue year after year. However, after decades of growth, the sales curves associated with traditional games seem to be flattening out. Consequently, both lotteries and their service providers are presently searching for new forms of gaming.

To date there has been much speculation about enabling various lottery products to become available to the consumer over the Internet. The benefits are obvious: greater accessibility and a richer gaming environment for the player resulting in enhanced sales. However, there are various jurisdictional laws and statutes (e.g., the United States Wire Act) involving interstate gambling that in the past have brought into question the legality of such an enterprise. Though recently, the United States Department of Justice concluded that the Wire Act's " . . . prohibitions relate solely to sport-related gambling activities in interstate and foreign commerce . . . . "

In the past, United States lotteries have used the Internet as a vehicle for disseminating information about their lottery organizations, their games, and their promotions. They have also used the Internet for simulations of classic instant ticket games, games solely for entertainment without a fee, a means to communicate with players, for selling subscriptions to traditional lotto games, and for second chance drawings—drawings for prizes resulting from non-winning experiences based on the sale of a regular lottery ticket through historic channels. However, now that it would appear that Internet lottery games are to become part of the fare offered by US (and other jurisdictions) lotteries, appropriate adherence to lottery security and fair play standards is essential, as is designing a mechanism that meets applicable political and legal constraints.

To ensure that these standards and constraints are maintained through the rollout of Internet gaming, it is logical to, initially at least, provide Internet games of a deterministic nature, wherein the outcome (i.e., prize winning status) is regulated either by a secured validation file or some form of Pseudo Random Number Generator (PRNG). The significant point being that the game outcome is determined by lottery-controlled factors outside of any decisions or controls available to the consumer of the Internet game. This type of deterministic gaming mimics the games currently offered by lotteries (e.g., scratch-off tickets, Pick 3, Pick 4, Powerball, etc.), thereby making it a simpler task to ensure that security and standards are maintained.

However, over the years United States lotteries have come to appreciate the virtues of producing games with more entertainment value that can be sold at a premium price. For instance, ten-dollar scratch ticket games with higher paybacks, and more ways to win now account for over $5 billion a year in United States lottery sales. Making Internet delivered games more challenging and introducing skill levels (e.g., Internet Poker) may help attract a new player base and consequently increase revenue. Additionally, since more challenge gaming formats often require a large player base, an ideal security audit system would also accommodate networking players as well as jurisdictions together while still ensuring fairness and auditability. Thus, while initially lottery controlled Internet gaming sites may be limited to deterministic games, an ideal security and audit system would create a foundation that allows for the gradual expansion of lottery Internet gaming themes to evolve to include player alterable games over a large player base ultimately allowing a player's decision to influence the game's outcome and thereby determine if he or she has won a prize.

Moreover, as gaming technology and systems continue to evolve and become more sophisticated, numerous new types of lottery related games and products become available that require new methods of security and auditing to ensure lottery rules are maintained. Thus, it is highly desirable to develop a lottery Internet gaming platform that provides security and auditing methods for new Internet gaming opportunities. Ideally this lottery Internet security platform should be evolutionary in nature, starting with a familiar format that gradually introduces a consumer to Internet and other new gaming formats.

SUMMARY

Objects and advantages of the invention will be set forth in part in the following description, or may be obvious from the description, or may be learned through practice of the invention.

Various inventions are enabled by the present description. A particular one of these inventions includes embodiments related to an Internet gaming system having a core platform with a hardware and software configuration to provide common functionalities to a plurality of different Internet-based games made available for play on an Internet game site. These different games may be provided by a common or different game developer to a lottery authority or administrator. The games are "different" in that they generally have separate prize structures, although different themed games may be provided within a common prize structure, as described more fully herein.

The system includes a vertical extension functionality configured with the core platform, wherein core platform input/output data is transmitted through the vertical extension. The vertical extension includes a first application programming interface. A plurality of game specific modules are provided, wherein each module includes a hardware and software configuration to conduct at least one of the different respective games with players via the Internet game site. Each game specific module includes a dedicated second application programming interface, wherein input/output data between the core platform and the game specific modules occurs only through the first and second application programming interfaces in the vertical extension.

The system includes a secure game outcome generator having a hardware and software configuration to determine a game outcome for each game played via the system. This secure game outcome generator is linked to the core platform via a secure interface with the vertical extension that is separate from the first and second application programming interfaces. Because of the isolation functionality provided by the vertical extension (including the application programming interfaces), the secure game outcome generator is not accessible by the game specific module through the vertical extension.

In a particular embodiment, the game specific modules are provided by different game developers, with the second application programming interface being generic to the game specific modules from different developers.

In certain embodiments, the game specific modules operate on a physically separate server from the core platform, and may include a firewall operatively configured between the first and second application programming interfaces.

The core platform may include generic functionality components for all games provided by the system, regardless of the type of games enabled by the different game specific modules. For example, the core platform may include an electronic commerce functionality component, a customer relationship management functionality component, and a player history/archive functionality component. In certain embodiments, the electronic commerce functionality component is linked to an external banking system via a secure firewall to provide any manner of financial transaction to enable payment/credit of funds for play of the games.

The game specific modules may be variously configured. In one embodiment, each of the game specific modules includes a game engine that executes all logic functions for play of the specific game, and a presentation/resources component that controls audio and visual display of the game to the player. This component may be periodically updated to change appearance of the game presented to the player.

The secure game outcome generator may operate on the same or a physically separate server from the core platform wherein a firewall is operatively configured between the vertical extension and the secure game outcome generator.

In some embodiments, the secure game outcome generator may include an interface separate from the vertical extension, wherein game specific outcome files are loaded into the secure game outcome generator for each game specific module. The game specific outcome files may include a validation file for each game play enabled by the respective game specific module, wherein the number of winners and losers for the totality of game plays enabled by the game specific module is predetermined by the validation files. The validation files may be linked to respective game plays by a code (e.g., provided on a ticket supplied to the player) entered by a player upon initiating play of the game via the Internet, wherein the code is received by the game module, passed through the first and second application programming interfaces of the vertical extension to the core platform, with the core platform relaying the code to the game outcome generator. In further embodiments, the game outcome generator relays a predetermined game result dictated by the linked validation file back through the core platform and first and second application programming interfaces to the game specific module, which conducts and presents the game to the player to reflect the outcome. The game specific modules may include a plurality of different themed games, with the player being provided the option to select one of the games for play. The plurality of different themed games may share a common prize structure such that the predetermined game result is applicable to whichever game is selected for play by the player.

BRIEF DESCRIPTION OF THE DRAWINGS

FIG. 5 is a common prize structure of the three representative examples of Internet lottery games of FIG. 4 that are in turn enabled by the lottery instant ticket of FIG. 3;

FIG. 12 is a front plan view of a representative example of an Internet gaming script of FIG. 11 with its sensitive data decrypted as clear text;

FIG. 17 is a front plan view of a representative example of an Internet gaming script generator human interface for Random Number Generator (RNG) games to enable a RNG version of the Internet game screens of FIG. 13;

DETAILED DESCRIPTION

Figure 1:
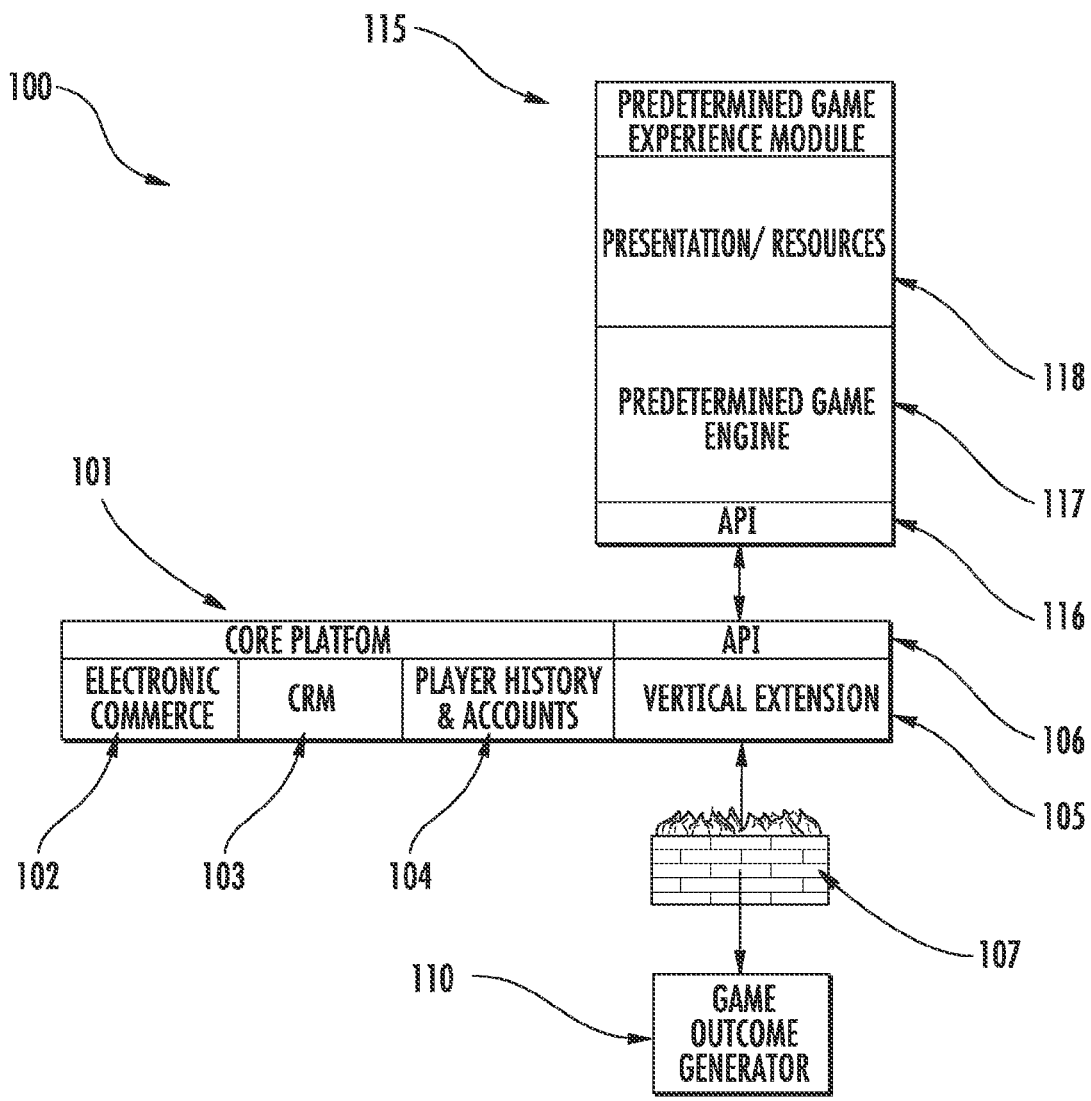
FIG. 1 is a block diagram of a first representative example of an Internet gaming system configured for predetermined outcome with an isolated game outcome generator.

Reference will now be made in detail to embodiments of the inventive methods and systems, one or more examples of which are illustrated in the drawings. Each embodiment is presented by way of explanation of the invention, and not as a limitation of the invention. For example, features illustrated or described as part of one embodiment may be used with another embodiment to yield still a further embodiment. It is intended that the present invention include these and other modifications and variations as come within the scope and spirit of the invention.

FIG. 1 depicts a first representative example of an Internet gaming system 100 having three primary components. The first is a core platform 101 that provides generic functionality (e.g., electronic commerce 102, player accounts, etc.) as well as a vertical extension 105 for an Application Programming Interface (API) 106 for predetermined game specific modules 115, as well as a secure interface to a game outcome generator 110. The predetermined game specific module 115 is customized to provide a specific gaming experience (e.g., Bingo, instant reveals, crossword puzzle, etc.) using its game specific predetermined engine 117 and associated resources 118, which in turn interface to the core platform 101 via the API exchange 106 and 116. The secured game outcome generator 110 determines the outcome of all games being played as well as, optionally, maintaining an auditable archive file of the games played. As illustrated in FIG. 1, the secure game outcome generator 110 ideally includes added security measures such as an additional firewall 107 helping to isolate the game outcome generator 110 from the predetermined game module 115 and even the core platform 101.

Security benefits to the overall architecture 100 of FIG. 1 are numerous, including isolating the game specific module 115 from the core platform 101 at the vertical extension 105 with an API 106 and 116. The API of 106 and 116 only allow specified Input/Output (I/O) between the core platform 101 and the game specific module algorithm 115. From a security perspective, this is significant since the game specific module 115 will vary from game to game, and may be developed by parties other than a lottery or game operator. This uncertainty of developers begs the possibility of malware being introduced into the gaming system 100 through a possible third party developer of the game specific module 115. More importantly, the game specific module 115 is the software that will interface to the consumer and consequently the outside world. Thus, the greater degree of isolation of the game specific module 115 from the core platform 101, and ultimately the game outcome generator 110, the better. By restricting the game specific module 115 I/O to the vertical extension 105 via APIs 106 and 116, all interaction to the core platform 101 are governed by the APIs. Hence, with judicious care of the core platform API 106 development, the predetermined game module 115 can operate within its own memory space or sandbox with its only access to the core platform 101 via the API 106, which due to the limited number of API calls allow for interface protection (e.g., buffer overflow attacks) to be built into the core functionality of each API 106 call. Additionally, by only allowing the isolated game specific module 115 to conduct I/O through vertical extension 105 APIs 106 and 116, the game specific module has no direct access to the game outcome server 110, which ultimately determines if a prize will be awarded for any game.

Figure 2:
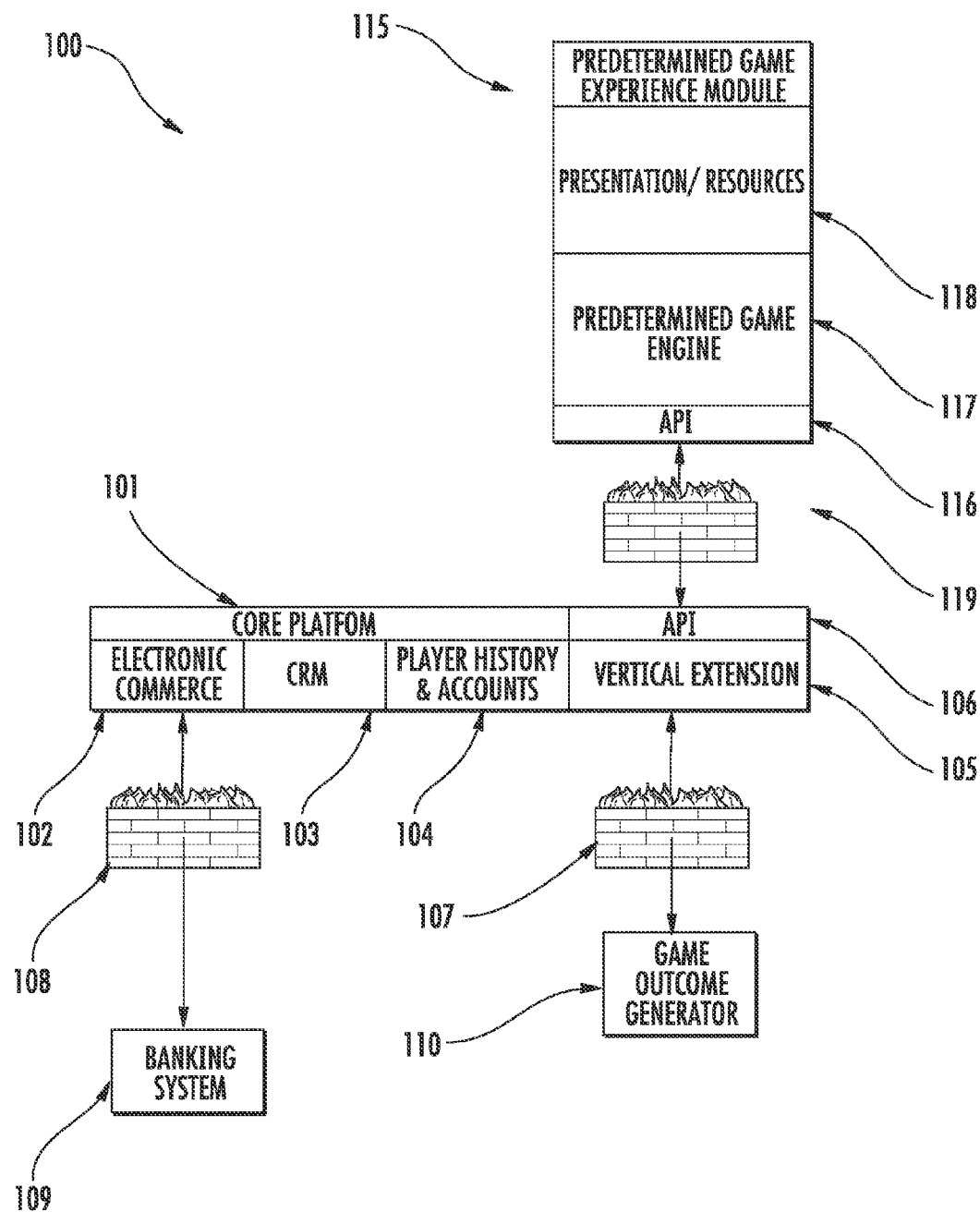
FIG. 2 is a block diagram of a first representative example of an Internet gaming system of FIG. 1 wherein the game specific and electronic commerce modules operate on separate servers along with an isolated game controller/logger.

This general concept of isolation for the game specific module 115 can be extended to another level by only allowing the game specific module 115 to operate on a physically separate server. As illustrated in FIG. 2, isolating the game specific module 115 on a separate physical server easily allows for an additional firewall 119 to be placed between the game specific module API 116 and the vertical extension API 106 thereby further segregating the gaming system 100 to only the game specific module 115 memory and hardware. With this isolation, even if an offsite hacker was somehow able to gain root access to the game specific module 115 server, the security breach would still be confined just to that server with the game outcome generator 110 as well as other core platform 101 functionality still remaining protected. Indeed, since the game specific module 115 only communicates with the core platform 101 via APIs 106 and 116, the security settings on the firewall 119 between the two can be configured extremely tight, only allowing predefined I/O packets from predefined Internet Protocol (IP) addresses to pass. Another feature of this separate server configuration is that loading of the game server due to the popularity of one or more games will not impact the performance of the core platform 101. Additionally, isolation of the game server readily adapts to allowing multiple game servers to be installed for different games.

As also illustrated in FIG. 2, this isolation paradigm can be further expanded to isolate the core platform 101 electronic commerce's 102 I/O to an external banking system 109 (e.g., debit card issuing processor, direct deposit/withdraw, prepaid account, PayPal account, etc.) with its own firewall 108. Like the game module 115, the finite set of I/O calls between the electronic commerce's 102 functionality and the external banking system 109 allow for the firewall 108 security settings to be configured extremely tight, only allowing predefined I/O packets from predefined IP addresses to pass.

Returning to a description of the primary components of the Internet gaming system (the core platform 101, game module 115, and game outcome generator 110), as its name implies, the core platform 101 is designed to be the stable platform that does not change from game-to-game. The core platform 101 provides and maintains the standard services required of all games including the vertical extension 105 and associated API 106 for all intra-system 100 I/O associated with each game module 115. As previously discussed, the finite nature of the core platform API 106 allows for a degree of isolation from the game module 115, as well as establishing a generic interface for game module development. The core platform API 106 allows access to specified functionality with the core platform's 101 three key components of: electronic commerce 102, Customer Relationship Management (CRM) 103, and player history and accounting archive 104. Additionally, the core platform's 101 vertical extension also allows for gaming related I/O between the separate game outcome generator 110 through a secure interface that ideally would include firewall 107 protection as well as optionally, I/O with a separate banking system 109 (FIG. 2) with its own security (e.g., firewall 108). If secure I/O with a separate banking system 109 were employed, then all I/O would be conducted via the vertical extension and the electronic commerce 102 component.

The Internet gaming system 100 game module 115 is designed to be unique to each game offered. However, for all games, the same core set of API 116 would be employed. The primary components of the game module 115 are the game engine 117 and associated presentation/resources 118. The game engine 117 executes all logic for the game in play receiving its inputs from both the player and the game outcome generator 110 via its API 116. In some embodiments, the game engine 117 outputs game play to the player as well as a log of each display/outcome to the game outcome generator 110. Most visual and audio and other miscellaneous game functionality displayed to the player is retrieved/drawn from the data maintained in the associated presentation/resource component 118. Thus, under some circumstances, the appearance of the game can be changed by replacing the data in the presentation/resources component 118 of the game module 115—e.g., changing the screen display from one lottery logo and name to another. This allows for the game module 115 (more particularly, the component 118) to be routinely updated in appearance without the need for extensive testing that would be necessitated by a change in logic in the game engine 117. The architecture of the game module 115 with its fixed generic API 116 supports implementation of a game module 115 developer's kit wherein a multiplicity of parties can develop their own games and test them against a core platform 101 simulator, imposing few security threats to the actual Internet gaming system 100.

Finally, the Internet gaming system 100 secure game outcome generator 110 is the component that ultimately determines if a game will win or lose, or more to the point whether a particular player will win a prize. Thus, the game outcome generator 110 exists either within its own protected memory or on a physically different server than the core platform 101 and/or game module 115. This segregation of the game outcome generator 110 not only allows for increased security with ideally its own digital gatekeepers (e.g., firewall 107), but also allows for a separate interface for game outcomes to be loaded via possibly a separately secured API that is not necessarily controlled by the same administrators as the rest of the Internet gaming system 100.

In a particular embodiment, the separate interface could then be utilized to load validation files that determine a priori the outcome of a given game. In this embodiment, the game outcome generator 110 validation file is similar in design to a lottery central site instant ticket validation files, with one file per game series and the total number of winners and losers predefined for the life of the particular game type on Internet gaming system 100. This time honored method of controlling individual play outcome via a validation file has the advantages of a predictable and auditable prize payout while at the same time effectively shielding players from the win/lose information until a particular game is played.

There are numerous ways to link the validation file to a game being played on the Internet gaming system 100. In the most direct analogy to instant tickets, a serial or validation number is assigned to each game played on the Internet gaming system 100. In this embodiment, the validation number could be a specific code that the player types in to initiate game play—e.g., a one-time-code 251 (FIG. 3) copied from a ticket 250 or receipt signifying that the player has prepaid for game play. In any case, the game module 115 (FIG. 2) would first receive the start code and pass the code through API 116 and 106 to the vertical extension 105 of the core platform 101. The core platform 101 would then relay the start code to the game outcome generator 110. Since the start code would be packaged in a predefined API 116 by the game module, the format of the start code and the relayed core platform 101 IP address would be detected by the firewall 107 or other security barriers associated with the game outcome generator 110 and allowed to pass for processing. The game outcome generator 110 would then utilize the entered code 251 (FIG. 3) as a pointer to its associated validation file to determine if the ticket/receipt 250 associated with the entered code 251 is valid to initiate Internet lottery game play and whether the game play will ultimately win any prizes. Once the final outcome of game play is determined by the game outcome generator 110 (FIG. 2), a verification message enabling game play as well as the final outcome (i.e., what, if any prizes are awarded) would then be transmitted from the game outcome generator 110 through security barriers 107 to the core platform 101, which would then be relayed to the predetermined game module 115 via API's 106 and 116 and, optionally, through security barrier 119.

Figure 3:
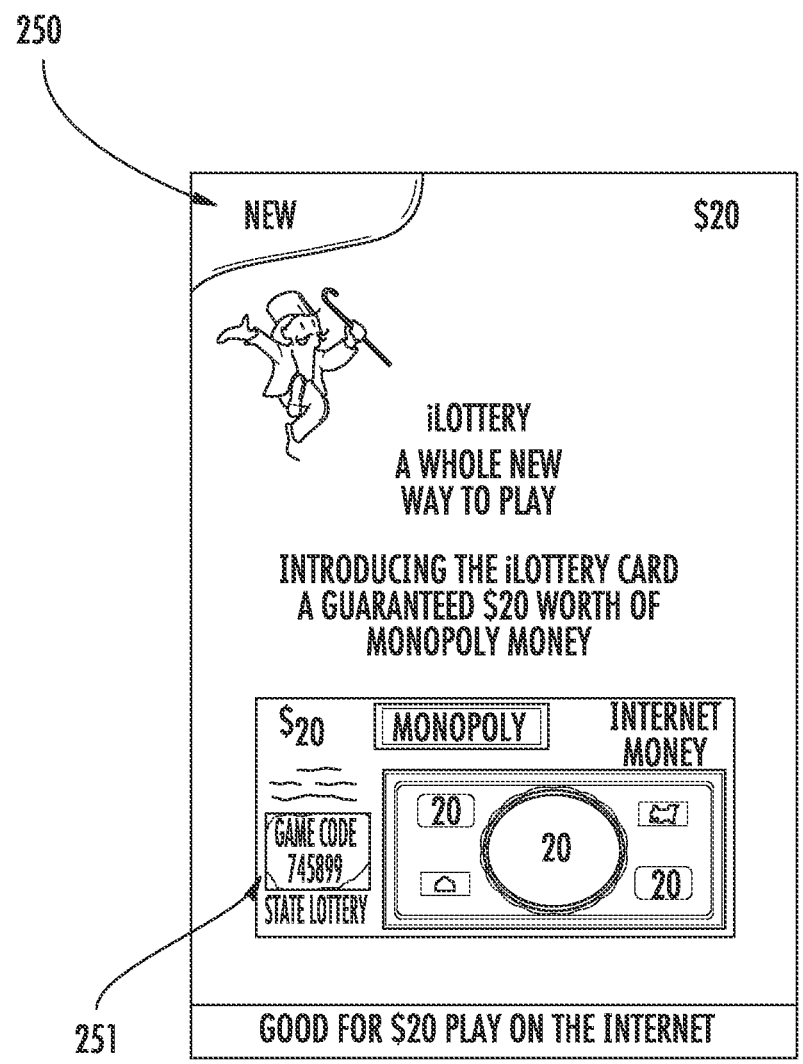
FIG. 3 is a front plan view of a representative example of a lottery instant ticket with a specific code enabling play over the Internet.

Since the outcome of the game is predetermined in this embodiment, the enabling communications from the game outcome generator 110 to the predetermined game module 115 would include the final prize amount (if any). However, this is not to say that the a priori determination of the final prize amount dictates the exact game and associated play style for the consumer. As illustrated in FIG. 3, the enabling ticket 250 purchased at the retailer may be marketed as a set amount of play (e.g., $20 worth as illustrated on ticket 250) over the Internet—i.e., no specific game type or style is specified. Thus, the enabling ticket 250 does not necessarily specify what game is to be played or any play style, leaving the consumer free to try any game offering on the lottery Internet site and even change games before his or her purchased amount of play is exhausted. However, in one embodiment, no matter what games the consumer chooses or how he or she decides to play the games, the final outcome will still be determined by the activation code 251 initially entered by the consumer.

Figure 4:
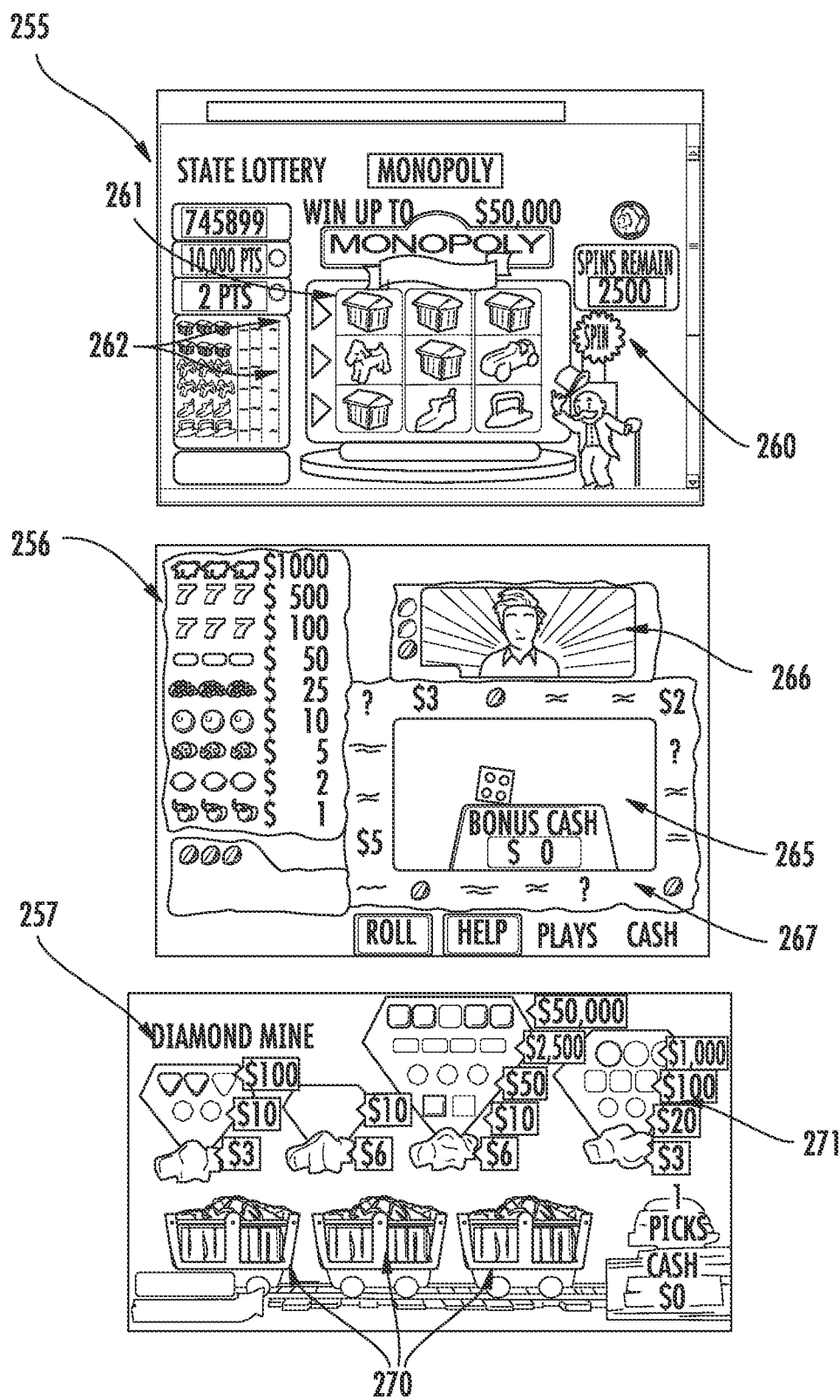
FIG. 4 are front plan views of three representative examples of Internet lottery games enabled by the lottery instant ticket of FIG. 3.

This is possible if the multiplicity of games offered on the Internet site 100 (FIG. 1 and FIG. 2) all share the same prize structure. For example, FIG. 4 illustrates three different Internet lottery games 255, 256, and 257 with completely different game themes. Game 255 features a monopoly slot machine wherein the player clicks on the slot machine spin lever 260 attempting to obtain three matching symbols 261 in any selected row 262. In contrast, game 256 features a virtual dice roll 265 that also triggers either a matching symbol or bonus display 266, as well as a parameter of bonus features 267. Finally, game 257 allows the consumer to tip over one of three virtual mining carts 270, possible revealing previously hidden gems that match a prize chart 271. However, the seemingly three different games 260, 261, and 262 all share the same common prize structure 275 illustrated in FIG. 5. As an example, the prize structure 275 can be funded by tickets of type 250 (FIG. 3) enabling play on the seemingly different games 255, 256, and 257 with, for example, a print run of one million tickets (276—FIG. 5) and arbitrary prize fund of 65% resulting in overall odds of winning of 1:3.25. As shown in the associated prize structure 275, there are fourteen different possible outcomes illustrated in column 277 ranging from $3 to $50,000. All of these fourteen possible outcomes are supported with all three games in the example—i.e., 255, 256, and 257 (FIG. 4). For example, in game 257 (Diamond Mine) the consumer wins by uncovering multiple gems that fill rows to win a designated prize 271. Reviewing each row and combinations thereof reveals that all fourteen possible outcomes from prize structure 275 (FIG. 5). While the play mechanics differ for the other two games 255 and 256 (FIG. 4), the combination of wins and loses will always be a subset of the fourteen different possible outcomes illustrated in column 277 (FIG. 5) ranging from $3 to $50,000.

This is not to imply that one Internet gaming site 100 (FIG. 1 and FIG. 2) must operate only one prize structure. Multiple prize structures can be established within the same Internet gaming site with the games associated with a given prize structure linked to a subset of data (e.g., three decimal digit game family number) embedded in the activation code 251 (FIG. 3) or other data that is entered by the consumer when he or she initiates play. In this embodiment, the prize structure enabled by the code subset entered by the consumer would automatically trigger the family of games associated with the given prize structure to be offered to the consumer. This family of games can appear to be radically different to the player.

By utilizing a priori game outcomes with a common prize structure for a multiplicity of games, the associated redemption, audit, and security requirements for Internet games can be significantly reduced. This is true because the various games are essentially different skins that offer varying play styles that can be switched on the fly from game-to-game since all games share a common prize structure. Thus, no matter what series of games or plays a consumer chooses, the a priori final result is assured and the prize payout (if any) will always remain the same for a given activation ticket. This in turn allows for the traditional lottery central site and retailer network to process validations without any interface to the Internet gaming site. This complete isolation of the Internet gaming site from the lottery payout system creates separate security Zone—e.g., a complete security compromise of the Internet gaming site would have no impact on the lottery central site and consequently normal lottery operations. Additionally, this separation allows both systems to run asynchronously of each other, allowing loading or audit functions to be conducted at each facility without regard to operation at the other facility.

Figure 6:
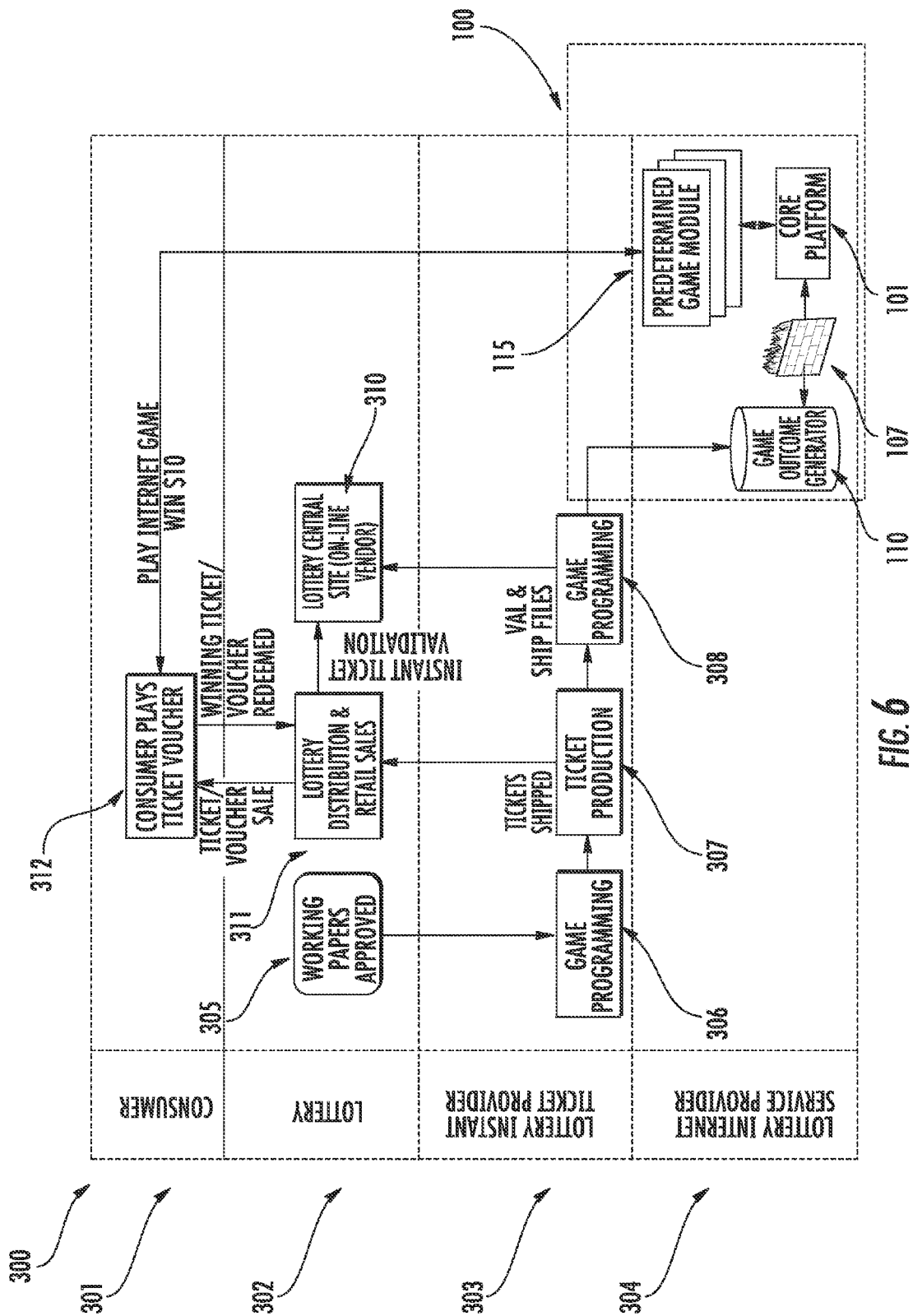
FIG. 6 is a block diagram of a first representative example of an Internet gaming system operating the Internet lottery games of FIG. 4 that are in turn enabled by the lottery instant ticket of FIG. 3 with the common prize structure of FIG. 5.

For example, FIG. 6 provides a block diagram 300 of one possible embodiment of an Internet gaming system 100 enabled by tickets/vouchers 250 (FIG. 3), running a multiplicity of games (e.g., 255, 256, and 257 of FIG. 4), with a common prize structure (e.g., 275 of FIG. 5) that is physically separate from the lottery central site 310 (FIG. 6). For clarity, the block diagram of FIG. 6 is organized where the party responsible for completing a task is designated by row, with the consumer's actions confined to row 301, the lottery, central site operator, and designated retailer's actions confined to row 302, the lottery's instant ticket/voucher supplier confined to row 303, and a separate lottery Internet gaming provider confined to row 304.

As shown in FIG. 6, the lottery initiates the creation of a predetermined Internet game enabled by a ticket or coupon 250 (FIG. 3) by generating and approving specifications or working papers 305 (FIG. 6). Once the working papers 305 are approved, the lottery instant ticket service provider's game programming 306 generates the data that will be used to enable play on the Internet game site 100. This data will be in the form of traditional instant ticket imaging that distributes the winning and non-winning indicia over the ticket/coupon 250 (FIG. 3) print run, as well as the cryptographically linked codes that will be loaded into the Internet gaming site 100 (FIG. 6) game outcome generator 110. Once the initial game generation 306 is completed, the indicia data 251 (FIG. 3) is printed over a ticket/voucher 250 production print-run 307 (FIG. 6), with the produced tickets shipped to the lottery distribution center and ultimately to the retailers 311. At approximately the same time, the digital validation and ship files are transferred from game programming 308 to the lottery central site 310 thereby allowing the central site 310 to validate and authorize payment for winning tickets as they are presented to the retailer. Finally, game programming 308 also generates a data file linked to the indicia data 251 (FIG. 3) printed on tickets/vouchers 250 that is uploaded to the Internet game site 100 (FIG. 6) game outcome generator 110. In one embodiment, this data file could be a direct copy of the indicia 251 (FIG. 3) printed on tickets/coupons 250, with the security of the system being maintained by a Scratch-Off-Coating (SOC) obscuring the indicia until after purchased by the consumer. However, in a preferred embodiment, the Internet gaming site 100 (FIG. 6) data file differs from the lottery central site 310 validation file, as well as the ticket/voucher 250 (FIG. 3) indicia 251, but is cryptographically linked—e.g., a secure hash or Hash Message Authentication Code (HMAC) of indicia 251 data. This preferred cryptographic link embodiment establishes another layer of separation and security between the lottery central site system 310 (FIG. 6) and the Internet gaming site 100.

After the digital files are transferred and the tickets/voucher 250 (FIG. 3) are placed on sale at the retailer 311 (FIG. 6), a consumer purchases a ticket/voucher 312, removes the SOC, and enters the activation code indicia 251 (FIG. 3) on the Internet gaming site 100 (FIG. 6). The activation information is initially received by a dummy game module 115, whose purpose is to accept new ticket/voucher entries, and then passed through the Internet gaming site 100, via the core platform 101 and isolation firewall 107 to the game outcome generator 110 where the activation code is checked to determine if it is valid—e.g., computationally correct, not previously played, etc. If the game outcome generator database were cryptographically linked to the validation code (e.g., Secure Hash Algorithm—SHA, asymmetrical encryption, etc.), the game outcome generator 110 would first process the validation code with the appropriate algorithm prior to referencing its database. Assuming the authentication code is valid, the game outcome generator 110 would then: authorize play, determine the final outcome, and determine the appropriate prize structure and associated games for the authentication code. All of this information would then be passed through the firewall 107, to the core platform 101, and to the initiating dummy game module 115 in the Internet gaming site 100. The consumer then selects which game(s) he or she wants to play based on the available predetermined game modules 115 associated with the entered activation code and associated prize structure. The consumer then plays out the game(s) to conclusion, ultimately revealing the a priori prize value dictated by the activation code—e.g., $10. After the consumer has completed play and seen the final results displayed on his Internet viewer 312, he would then take the same ticket/voucher 250 (FIG. 3) back to a lottery retailer 311 (FIG. 6) for validation. The retailer 311 would then scan the barcode on the back of the ticket/voucher 250 (FIG. 3) and enter any extra validation data. The validation request when then be passed through the normal lottery network from the retailer 311 (FIG. 6) to the lottery central site 310 wherein the standard instant ticket validation routine would then access the appropriate validation file and verify that the ticket was not previously redeemed and if it was a winner (e.g., $10). Assuming the ticket was a winner, the payment authorization would then be transmitted back to the retailer 311 and the retailer would pay the consumer the same prize amount that was displayed on the Internet gaming site 100 even though the Internet gaming site 100 and lottery central site never communicated with each other.

The previous embodiments demonstrated how the Internet gaming system 100 would function and when entered activation code 251 (FIG. 3) would actuate game play as well as instruct the game outcome generator 110 (FIGS. 1, 2, and 6) as to whether or not the associated gaming experience would culminate in a win, and if so for how much. In an alternate embodiment, the entered activation code 251 (FIG. 3) is only utilized to simply activate a given quantity of game play (e.g., $20 worth of play as illustrated on ticket 250) with no algorithmic link to the outcome of game play. While this embodiment has the disadvantage of not seamlessly enabling winner validation and payouts at the existing retailer terminal without any existing lottery central site modifications, it has the advantage of enabling unrestricted Internet play based on the purchase price of the ticket or voucher—e.g., $20 for the ticket illustrated in FIG. 3. Additionally, since this embodiment actually denotes the amount of funds committed to Internet gaming, the activation code 251 can be used to allow purchases of games of chance that do not require a predetermined outcome (e.g., draw games like Powerball, Pick 3, Pick 4, etc.) yet still employ the same Internet gaming system 100 architecture (FIGS. 1, 2, and 6) of the previously described embodiments.

In an alternate embodiment, the Internet gaming system 100 uses the same three primary components as before—i.e., core platform 101, game module 115, and game outcome generator 110 (FIG. 2)—with the core platform 101 designed to be the stable platform that does not change from game-to-game while providing/maintaining the standard services required of all games. As previously discussed, the finite nature of the core platform API 106 allows for a degree of isolation from the game module 115, as well as establishes a generic interface for game module development. The core platform API 106 allows access to specified functionality as well as gaming related I/O between the separate game outcome generator 110 and a separate banking system 109 with separate security (e.g., firewall 108).

Also, as before, the Internet gaming system 100 game modules 115 are designed to be unique to each game offered, as well as function as an User Interface (UI) with the same core set of API 116 employed. Though, in a preferred embodiment, the secure game outcome generator 110 not only deals with a priori games, but also can be employed to determine winning and losing status at the time of play via a Pseudo Random Number Generator (PRNG) or other means. Furthermore, in the case of future draw games (e.g., Powerball, Pick 3, Pick 4, etc.), the game outcome generator 110 can also be employed to review previous bets to correctly notify (and optionally credit) consumers and associated accounts when a winning draw occurs. As should be appreciated, these additional applications of the Internet gaming system 100 to include both a priori and non-predetermined games greatly expands the platform's utility and value while still maintaining the enhanced security of protected memory and/or a physically different server than the core platform 101 with limited APIs.

As previously stated, embodiments may have the disadvantage of not being able to utilize the existing lottery infrastructure for validation and payment of prizes. Although, integrating the Internet gaming system 100 to existing closed/open loop debit systems can readily mitigate this disadvantage. A closed loop account is an account that does not support general purpose payment instruments with restricted acquiring (loading) and issuing (payment) to a fixed set of institutions (e.g., Starbucks and Home Depot gift cards, department store layaway programs, etc.), while an open loop account supports general payment instruments (e.g., Visa, MasterCard, American Express, etc. debit and credit cards). By judiciously integrating both closed and open loop payment systems with the Internet gaming system 100, a synergistic whole emerges that supports winning payouts and a multiplicity of payment systems while at the same time greatly reducing Internet gaming operating costs.

Figure 7:
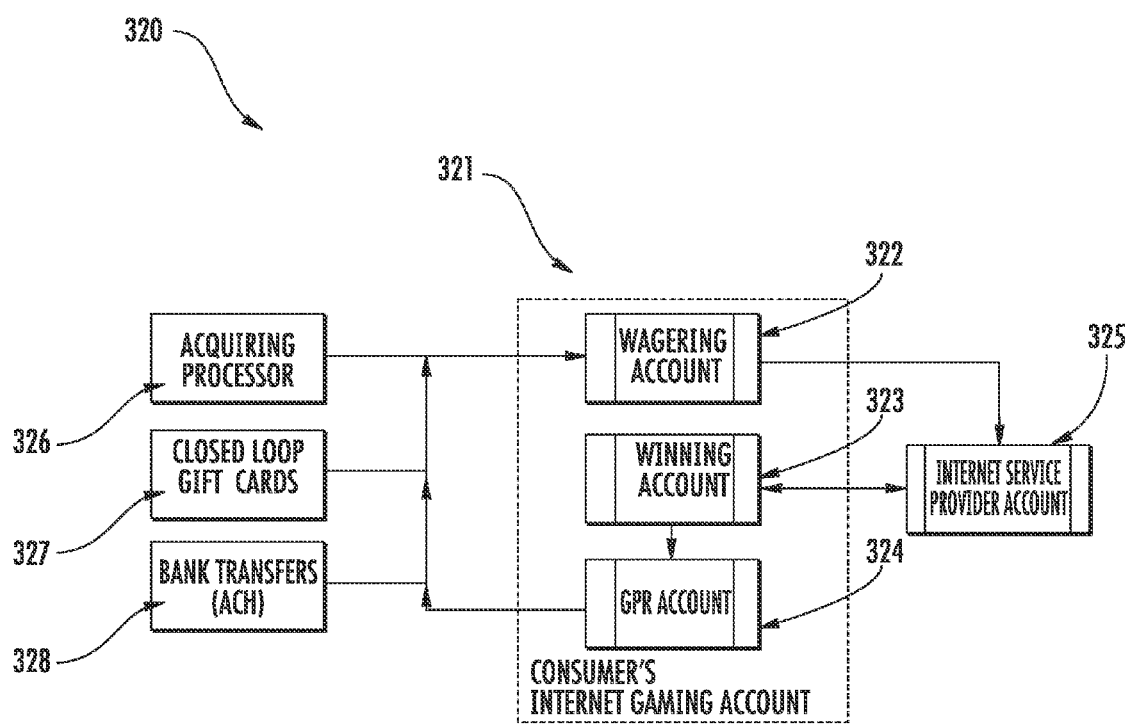
FIG. 7 is a block diagram of a first representative example of an financing system compatible with the Internet gaming systems of FIG. 2 and FIG. 10.

For example, FIG. 7 illustrates one possible embodiment of an integrated closed/open loop debit system 320 adapted for Internet gaming support. In this embodiment, the consumer is issued two closed loop 322 and 323 and one open loop General Purpose Reloadable (GPR) 324 sub-accounts tightly integrated to appear as one overall Internet gaming account 321. This overall account integration allows for the consumer to perceive one overall account 321 while at the same time allowing Internet gaming transactions to occur at little or no cost—thereby enabling micro and nano wagering and prize payouts. (Though the actual amount threshold differs, micropayments were originally envisioned to involve transactions of less than or equal to $1 USD and nanopayments were envisioned to involve transactions of less than 10¢ USD). This micro- and nano-wagering/payout support is possible because of the two closed loop accounts 322 and 323 integrated as part of the overall consumer's gaming account 321. As illustrated in FIG. 7, closed loop wagering account 322 can receive financial loads from a multiplicity of sources such as an acquiring processor 326 accepting debit or credit cards over the Internet, or closed looped Internet gaming gift cards 327 sold at traditional brick and mortar retail stores, or direct bank ACH (Automated Clearing House) transfers, or from the associated GPR account 324, etc. In all cases, these financial loads are conducted as a load transaction where the resulting funds are deposited into the consumer's wagering account 322. Any fees associated with the financial loading process (e.g., acquiring processor gateway and interchange fees for accepting a credit or debit card) are garnered at the time of the load. Once deposited into the consumer's closed loop wagering account 322, the funds can then be spent in micro or nano increments by electronically transferring the micro/nano wager from the consumer's wagering account 322 to the Internet service provider's Internet gaming account 325 for little or no fee—i.e., there is no interchange fee associated with the wager. Thus these $1, or 50¢, or less wager amounts can be made on each wager, thereby only gradually depleting the consumer's closed loop wager account 322 total and enabling a longer and more enjoyable play experience. Of course, the cost of transfer is further reduced or even eliminated if the consumer's closed loop wagering account 322 and the Internet service provider's Internet gaming account 325 reside at the same banking institution.

This micro- or nano-payment paradigm can be extended to the Internet service provider paying out prizes. The only difference being that the funds is transferred from the Internet service provider's Internet gaming account 325 to the consumer's closed loop winning account 323. Again, the payment of winnings will garner little or no fees because of the closed loop nature of the accounts. Once transferred to the consumer's winning account 323 the consumer can cash out at any time by transferring the funds (again at little or no cost) from the closed loop winning account 323 to the open loop GPR account 324 associated with the consumer's gaming account 321 where the funds could be withdrawn from an ATM (Automated Teller Machine) or spent wherever the open loop association (e.g., MasterCard, Visa, Discover, etc.) affiliated with the GPR account is accepted. Alternatively, the consumer may elect to wager his or her winnings back onto the Internet gaming site. In this case, the funds are transferred back from the closed loop winning account 323 to the Internet service provider's Internet gaming account 325 again with little or no fees garnered.

Another benefit of maintaining multiple closed and open loop accounts seamlessly integrated into one consumer Internet gaming account embodiment is that the Internet gaming system can subject the funds in each account to different rules and regulations. For example, if the consumer's wagering account 322 can be funded via closed loop gift cards 327 sold at lottery retailer brick and mortar stores, a potential security problem arises. The lottery retailer could establish his or her own consumer Internet gaming account 321 and fund their wagering account 322 by simply purchasing all of the closed loop gift cards sold 327 at their establishment. In this example, the security problem arises because the lottery retailer is typically paid a commission on the sale of each closed loop gift card 327—e.g., 5% of the retail purchase price. Therefore, assuming the retailer could then transfer these loaded funds from their wagering account 322 to their GPR account, the retailer would automatically realize a profit from purchasing their own gift cards—i.e., 5% of the total funds purchased in this example. Whether technically legal or not, this type of closed loop gift card money laundering would cost the Internet gaming service provider profit as well as effectively locking out legitimate consumers by lowering the availability of the closed loop gift cards 327 on sale. However, if funds loaded into the consumer's closed loop wagering account 322 were obligated to only be spent on the Internet gaming site (i.e., once loaded into the wagering account 322, the only way to deplete funds was to transfer wagers to the Internet service provider account 325), then the profitability of closed loop gift card 327 money laundering would no longer exist and, therefore, the previously mentioned security threat would be eliminated. In this example, the consumer's closed loop wagering account 323 would not have any restrictions, thereby allowing the consumer to spend the proceeds as he or she pleases.

Still another benefit of maintaining multiple closed and open loop accounts seamlessly integrated into one consumer Internet gaming account embodiment is for implementing consumer draw game (e.g., Pick 3, Pick 4, Powerball, etc.) subscription accounts. Consumer draw game subscriptions exist when a consumer subscribes to be automatically entered into a periodic drawing for some fixed amount of money with either their preferred or randomly selected numbers. The traditional problem with draw game subscriptions is accounting for the payments over time—this is a particularly vexing problem when the game involves parimutuel payouts. Furthermore, problems have arisen when the cost of a draw game (e.g., Powerball from $1 a play to $2) was increased during a subscription period. All of these problems inherent in draw game subscriptions can be mitigated or eliminated with the integrated Internet gaming account embodiment of FIG. 7. When the consumer initially contracts for a subscription, the subscribed funds are loaded into his or her wagering account 322. As previously described, wagering account 322 can be setup with the funds remaining in the closed loop bank account 322 until the actual periodic draw game is accepting sales. Then on each draw game period, a micro payment (e.g., $1) can be debited from the consumer's wagering account 322 and transferred to the Internet gaming provider's service account 325 until the subscription ends and the obligated funds are exhausted. Thus, for the purposes of accounting, a subscription account has been modified to resemble a standard bet placed on each draw game when it occurs. Of course, in this embodiment, the consumer's wagering account 322 must be configured where the consumer cannot withdraw the funds after they are loaded and the User Interface (UI) must also be configured to not display the obligated subscribed funds as part of the wagering account 322 balance, but both of these restrictions are simply programming parameters for the wagering account 322 design.

Yet another benefit of the Internet gaming account embodiment is the lack of financial liability and banking type regulation inherent with the Internet gaming institution holding the consumer's funds in escrow—i.e., digital wallet. As illustrated in FIG. 7, this embodiment actually holds the consumer's funds in either closed loop (322 and 323) or open loop (324) accounts that are hosted by a bank, not the Internet gaming institution. Only when a wager is conducted are funds actually transferred from the consumer-owned closed loop accounts (322 and 323) to the Internet gaming institution account 325. Thus, each wager is a sale to the Internet gaming institution and not subject to possible banking regulations concerning holding another's funds in escrow or the liability inherent therein. When the Internet gaming institution pays out prizes, the converse is also true. Each prize payout is a direct transfer from the Internet service provider's account 325 to the consumer's winning account 323 with no restrictions placed on the winning funds. Again, the consumer's winnings are deposited directly into the consumer's closed loop winning bank account 323 and are never held in escrow by the Internet service provider.

The advantages of the integrated consumer's closed loop (322 and 323) and open loop (324) accounts being hosted by a bank are not just limited to liability reduction and differed regulation. By placing the consumer's funds under the control of a banking institution, the Internet game service provider is not required to be compliant with extensive banking industry security requirements (i.e., PCI—Payment Card Industry) thereby relieving the Internet gaming provider of the extensive compliance testing and audits associated with PCI compliance.

Figure 8:
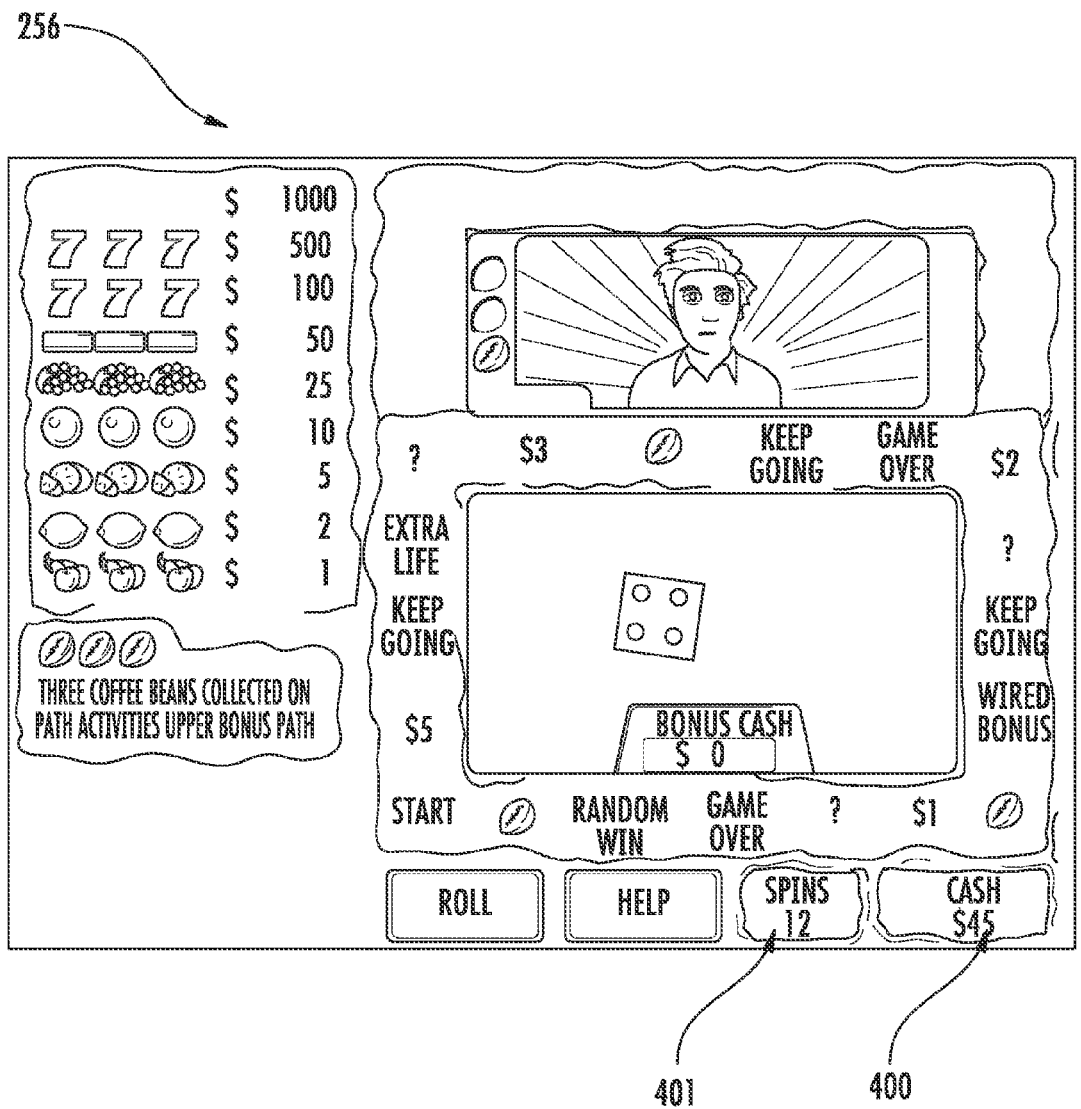
FIG. 8 is a front plan view of one of the representative examples of Internet lottery games of FIG. 4 with a cash and spin total on the screen of play that was enabled by the financing system of FIG. 7.

There are multiple embodiments for managing the User Interface (UI) of the integrated consumer's Internet gaming account 321. The most direct method is to display three separate balances for each sub-account—i.e., wagering account 322, winning account 323, and GPR account 324. However, this embodiment has the disadvantage of potentially confusing the consumer with three different balances. A alternative is to provide a summary total of the closed loop wagering 322 and winning 323 accounts as a banner or running cash window 400, as illustrated in FIG. 8. In this example, the running cash window 400 represents the total of the consumer's closed loop wagering 322 and winning 323 accounts of FIG. 7 (i.e., the total funds readily available for wagering), but not the associated GPR account (i.e., funds not directly available for wagering until a secondary transfer is initiated). As also illustrated in FIG. 8, this running cash window 400 of funds available for wagering can be separate from the number of plays or spins 401 in a particular game. This is because the number of plays or spins 401 represents the already purchased plays (plus possible bonus plays), while the running cash window 400 represents the funds available for wagering, but not committed to a particular game. In this embodiment, a detailed breakdown of all three sub-accounts (i.e., wagering account 322, winning account 323, and GPR account 324 of FIG. 7) would be available on a consumer summary screen separate from game play.

Figure 9:
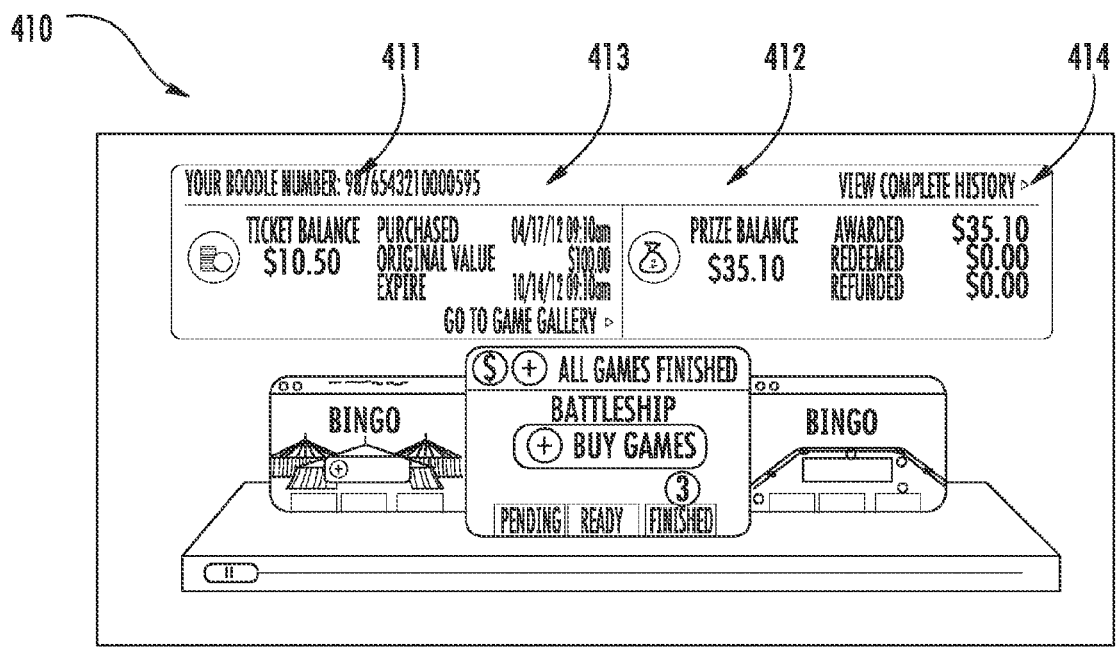
FIG. 9 is a front plan view of a representative example of interim game selection screen illustrating wagering and winning account totals that were enabled by the financing system of FIG. 7.

Another UI embodiment is to illustrate the balances of the closed loop wagering 322 and winning accounts 323 of FIG. 7 on an interim screen 410 of FIG. 9 when selecting a game to play. In this additional embodiment, the wagering 411 and winning 412 account balances are illustrated separately under different pseudonyms (i.e., Ticket Balance for 411 and Prize Balance for 412) that convey a more straightforward message to the consumer. Since screen 410 is of an interim (i.e., no game play directly involved) nature, additional information can be provided for the consumer like the original purchase or load 413 as well as the deposition of all winning funds 414 that would be too confusing and provide too much clutter on an actual gaming screen.

In addition to UI, the integrated consumer's Internet gaming account 321 of FIG. 7 necessitates only one form of consumer authentication for each sub-account—i.e., wagering account 322, winning account 323, and GPR account 324. This one form of authentication for multiple accounts is highly desirable to avoid potential confusion for the consumer. However, at the same time to avoid banking industry PCI security requirements, it is also essential for the Internet game provider to have no knowledge of the consumer's GPR account 324 or number. One possible embodiment is to cryptographically link the multiple consumer account numbers to one cipher text number maintained by the Internet game service provider with the non-clear text maintained by the PCI compliant issuing processor and the banking institutions maintaining the consumer's accounts. However, this embodiment has the disadvantage of key management coordination between the Internet game service provider and the issuing processor and banking institution. One alternative would be to allow the consumer to login with one account number (e.g., GPR account 324 number), perform a cryptographic hash (e.g., SHA) of the number on the consumer's Internet access device (e.g., computer, smart telephone, X-box, etc.) and only pass the resulting Hash Message Authentication Code (HMAC) to the Internet game provider. When the Internet game service provider wishes to access the consumer's closed loop accounts (i.e., wagering 322 and winning 323), the Internet game service provider would only pass the HMAC to the issuing processor and banking institution. The issuing processor/bank would then maintain a look-up table of HMAC values to account numbers. Another embodiment would be for the consumer to authenticate with only the issuing processor/bank, while the Internet game service provider only interacts with the issuing processor/bank via a series of API calls tied to a unique session identification value.

When initially setting up an account, there are varying federal and state laws for authenticating the consumer that must be accommodated—e.g., Know Your Customer (KYC) checks for new GPR accounts that include requiring entry of a full nine digit social security number. Regrettably, this level of authentication can be a deterrent to a casual player who may simply want to try Internet gaming without completing the formalities of a full KYC check for a GPR account. Fortunately, the integrated system of FIG. 7 can accommodate the casual consumer by effectively holding the GPR account in escrow unless the consumer wishes to cash out winnings via a GPR. By deferring access to the GPR until the consumer wishes to cash out winnings, the burdensome and intrusive KYC process is deferred until after the gaming experience is completed, or more to the point, the KYC is deferred until a positive winning experience occurs and therefore the requested information no longer seems so intrusive. Additionally, by deferring the KYC until a consumer wishes to cash out winnings, the more expensive authentication testing is not only deferred, but also only applied to presumably subset of the total number of people playing—thereby, providing a significant cost savings. The logistics of enabling differed KYC is tied to restricting access of the consumer to the GPR account until he or she wishes to cash out. With the integrated multiple accounts 321 inherent in the preferred embodiment, this hiding or restriction of the GPR account becomes a trivial programming exercise. Initially, the consumer may be required to register with simply proof of age authentication. At its minimum, proof of age may be simply answering an onscreen dialog box to the positive. A more extensive age check could be accomplished by verifying entered name and address data against a known database. At any rate, the requirements for age authentication are significantly less than what is required for a GPR KYC. Once age is authenticated, the consumer is given an account number/identification that is linked to the overall integrated account 321 as opposed to the GPR account 324 number, with the GPR account 324 remaining unknown to the consumer. Thus, since the consumer has no method to gain access to the GPR account 324 number, they have no way of accessing the virtual GPR account and therefore there is no need to perform a KYC at that time. When the consumer wants to cash out, they can request a GPR account, complete the required KYC information, and then be given access and all appropriate information associated with the GPR account 324 tied to their overall integrated account 321. At that time, the consumer can also be asked if they would like to receive a plastic card to further utilize their GPR account.

Figure 10:
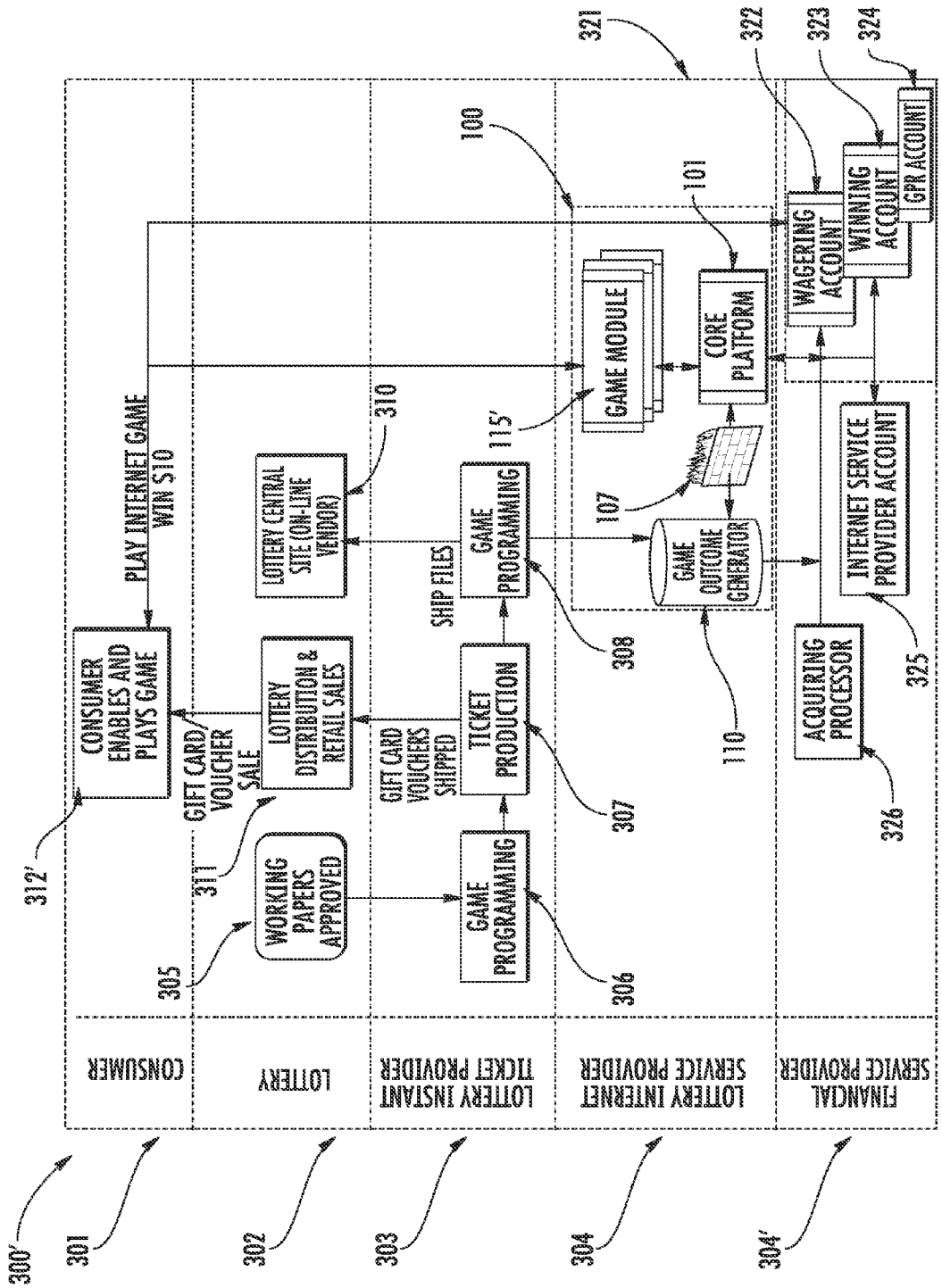
FIG. 10 is a block diagram of a first representative example of an Internet gaming system using the finance system of FIG. 7 operating with both predetermined and non-predetermined gaming.

When the preferred integrated closed/open loop debit system 320 is interfaced to the preferred non-deterministic Internet gaming system 100, the resulting synergistic system allows for both deterministic and non-deterministic Internet play and wagering without impacting the traditional lottery central site 300'—see FIG. 10. For clarity, the block diagram of FIG. 10 is organized where the party responsible for completing a task is designated by row, with the consumer's actions confined to row 301, the lottery, central site operator, and designated retailer's actions confined to row 302, the lottery's instant ticket/voucher supplier confined to row 303, the lottery Internet gaming provider confined to row 304, and the financial service provider to row 304'.

In the embodiment shown in FIG. 10, there are multiplicities of methods to initiate and fund Internet play. A lottery can create a ticket or coupon 250 (FIG. 3) with the lottery instant ticket service provider's game programming 308 generating the data that will be used to enable play on the Internet game site 100. This data will be in the form of traditional instant ticket imaging that distributes the winning and non-winning indicia over the ticket/coupon 250 (FIG. 3) print run, as well as the cryptographically linked codes that will be loaded into the Internet gaming site 100 game outcome generator 110 with the associated tickets or coupons placed on sale for the consumer to purchase and enter the code for game play 312'. Another possible method of enabling Internet game play in this embodiment is for the consumer to enable play directly with the Internet game site 100 via debit or credit card load or ACH from their bank account 312'.

In any case, the consumer's purchase (e.g., ticket, debit/credit card load, ACH, etc.) enables both deterministic and non-deterministic game play in this embodiment 312' with the support of the integrated consumer accounts 321 and the integrated closed/open loop debit system 320 (FIG. 7) subsystem that tallies the consumer's funds available for play in his or her wagering account 322, as well as any residual winnings in the winning account 323. As illustrated in FIG. 10, the consumer can communicate with either the Internet gaming system 100 or their accounts 321 directly, though the switching between sites would most probably be transparent to the consumer. Once the consumer initiates game play, 312' his or her wagering account will transfer funding a game at a time to the Internet service provider's account 325, interfacing via a defined API with the core platform 101 for each game play. When the consumer wins a prize, the core platform 101 notifies the Internet service provider account 325 to transfer the winning funds directly to the consumer's winning account 323.

Therefore, it can be seen that the combined embodiment illustrated in FIG. 10 enables Internet game play using a multiplicity of funding options, including tickets or vouchers sold at brick and mortar retailers, without impacting or necessitating any changes in the traditional lottery central site 310. Also, this leveraging of both the existing lottery infrastructure for sales support as well as other means of funding, while at the same time supporting both predetermined and non-predetermined games, is made possible with the embodiment's combination of integrated closed/open loop debit system 320 interfaced to the Internet gaming system 100.

No matter what method is employed to fund and initiate Internet gaming, there remains a need to ensure secure control, as well as auditability of the game outcome. In most cases for non-draw games, the game outcome generator 110 of FIGS. 1, 2, 6, and 10 will pass game authorization, game play details, as well as win/lose status to the game module. There are a multiplicity of embodiments for the game outcome generator 110 to pass the a priori play authorization, including the final outcome, appropriate prize structure, and associated games. In a preferred embodiment, the a priori play data is embedded in a play script. The exact format of the play script can vary, though it is preferred to use a standard format like Extensible Markup Language (XML) or JavaScript Object Notation (JSON). The significant point being that the script controls or sets the parameters for all parts of the game(s) that can impact the outcome—i.e., whether the consumer wins a prize or not.

Figure 11:
FIG. 11 is a front plan view of a representative example of an Internet gaming script resident on the game outcome generator of FIGS. 1, 2, 7 and 10 employing partial encryption of sensitive data with logistical data remaining as clear text.

For example, FIG. 11 illustrates a preferred embodiment of a play script 425. In this example, each game play within the play script is provided with a header 426 identifying the game and other parameters including unique sequence (inventory) 427 and validation 428 numbers. Immediately following the header is a seed data node 429 containing encrypted, sensitive data, including indicia definitions and sequences, as well as whether this particular game play will win and the associated prize. Finally, immediately following the cipher text 429 is the terminator indicating the end of the script for this game play.

The partial record encryption illustrated in FIG. 11 functions as the digital equivalent of a Scratch-Off-Coating (SOC). The concept being that the clear text portions of the stored play script 425 (e.g., header 426, sequence number 427, validation number 428, etc.) readily accommodate data lookup and auditing, while at the same time prohibiting anyone with access to the play script 425 file from being able to pick-out winning plays, since all sensitive (i.e., win/lose data) is only stored as cipher text. Since the sensitive data 429 is encrypted at the same time that play script 425 is generated while leaving the inventory data as clear text, the logistics of handling the play script are greatly simplified with routine data integrity checks, record processing, and audit functions all executed with clear text.

In the preferred embodiment of FIG. 11, the sensitive cipher text exists as a character data node due to the adoption of the XML standard for play script 425 file. Also in the embodiment of FIG. 11, the Advanced Encryption Standard (AES) was employed (base 64) to encode the sensitive data. Of course it should be appreciated that different formats as well as different encryption methods can be utilized to the same effect and may be preferred under some circumstances.

An advantage of the embodiment of FIG. 11 is that since each game play or record has its own discrete cipher text node, the system has the option of either encrypting all play scripts 425 in a game with one encryption key; or, utilizing multiple encryption keys (e.g., one unique key for each play script 425) for the multiple play scripts 425 in a game. Thus, the partial decryption architecture of FIG. 11 inherently accommodates a multiplicity of encryption keying schemes depending on the preference of the game outcome generator 110 (FIGS. 1, 2, 6, and 10) design. Regardless of the embodiment employed, the sensitive data 429 is encrypted at the time the overall play script 425 (FIG. 11) is created and remains encrypted until the actual game play is purchased. In other words, only the cipher text 429 associated with the purchased game play 425 is decrypted at the time of play—i.e., all other play fields in the game remain as cipher text in the stored game file. Therefore allowing all unsold game plays (and optionally sold game plays) to remain as cipher text 429 in the game file.

A decrypted version of the sensitive game data 429 of FIG. 11 is illustrated in FIG. 12 as 429'. As illustrated in FIG. 12, the decrypted data 429' (starting with the sub-header "<decryptedTicketData>") provides all of the play and win/lose parameters to the game module 115 (FIGS. 1, 2, 6 and 10) instructing it how to play out the game session and what prize (if any) to award.

Figure 13:
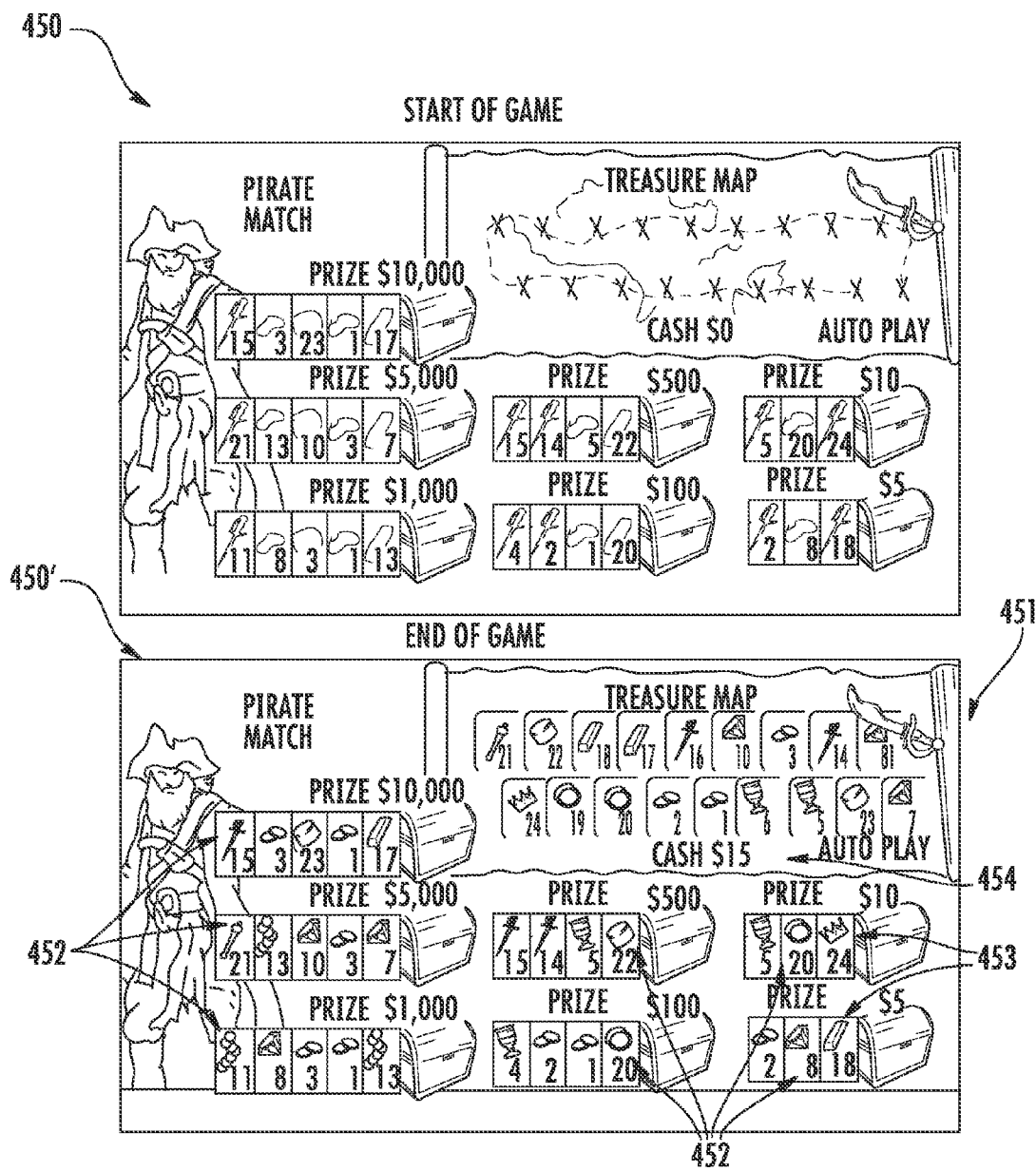
FIG. 13 is a front plan view of representative examples of Internet game screens enabled by the decrypted gaming script of FIG. 12.
Figure 14:
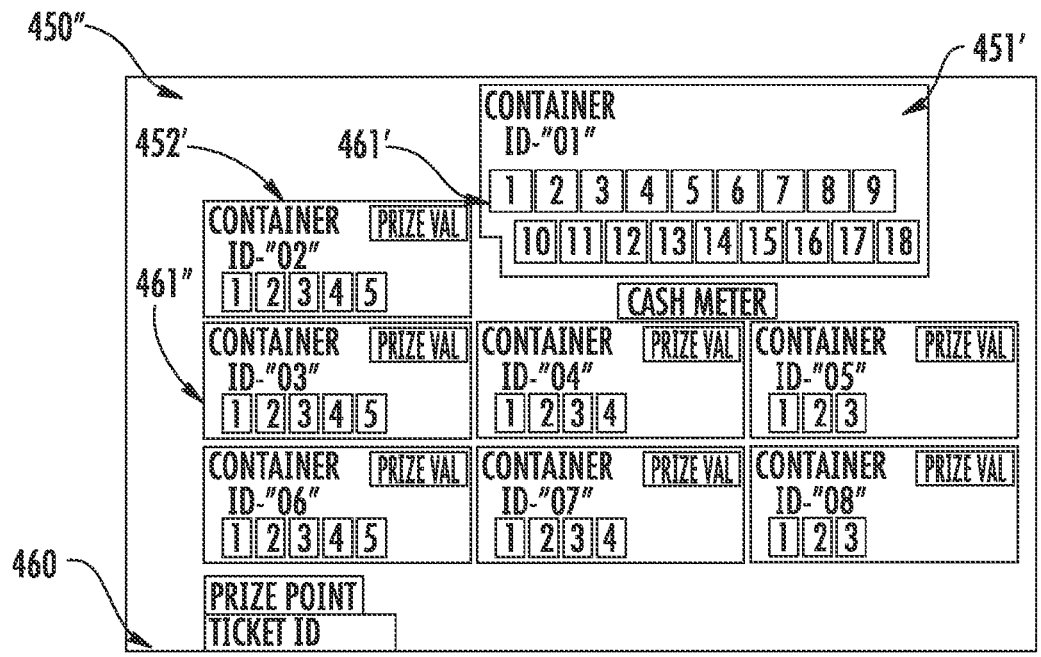
FIG. 14 is a front plan view of a representative two-dimensional layout example and associated indicia of Internet game screens of FIG. 13.

In the specific example of game script 425 of FIGS. 11 and 12, the decrypted sensitive data provides logistical information (e.g., "PricePoint"="15", "Version"="1.0.0", "Client"="EIT", "Type"="cash", etc.) as well as prize information (i.e., "type='cash' currency='USID'", prize= "00005", etc.) and play indicia (e.g., "id='01'>19<", etc.) The decrypted clear text sensitive data 429' of FIG. 12 thereby drives game play and formatting of the game module 115 (FIGS. 1, 2, 6 and 10) to create the sample play screen FIG. 13. FIG. 13 illustrates two screens from the same game (Pirate Match); the first screen 450 shows an example of a play screen at the start of play, while the second screen 450' illustrates one possible screen at the end of play. On the final screen 450', various indicia are illustrated in the treasure map section 451, as well as the seven prize sections 452. In this game, a player wins a prize by finding the five matching indicia needed to complete a prize section 452 from the treasure map section 451. Thus, the win or lose status, as well as the prize won, is determined in game 450/450' by the indicia available in the treasure map section 451. Additionally, the final screen also indicates winning status 453 for a given prize section 452, as well as the total amount of funds won 454. Controlling the two-dimensional formatting of the play screens in this embodiment is a layout map 450" (FIG. 14). The layout map 450" provides the interface between the game module and the win/lose script developers and allows for a generic layout that varies based on the input from the decrypted sensitive data 429' (FIG. 12). As illustrated in FIG. 14, the layout map 450" mirrors the layout of the before and after play screens 450 and 450' of FIG. 13, including the treasure map section 451' (FIG. 14) and prize sections 452' (only one highlighted in FIG. 14). Separate from the layout map 450" is the indicia matrix 460, which provides the graphic indicia that is arranged by the game to determine winning or losing status. For example, the gold scepter 461 (indicia 21) appears in the layout map 450" of both the treasure map 461' as well as 461" in position 1 of container "id=3". Thus, the decrypted sensitive data 429' of FIG. 12 drives game play and formatting by specifying the indicia placement, thereby ultimately determining game outcome, while the layout map 450" (FIG. 14) and indicia matrix 460 can be stored as clear text generic to the entire game in the associated game module game module 115 (FIGS. 1, 2, 6 and 10). Of course, the arrangement of the clear text sensitive data 429', as well as the game and layouts of FIGS. 13 and 14, are only representative and other formats (e.g., JSON) are possible and may be more desirable in some specific applications.

Another advantage of the partial encryption play scripts 425 of FIGS. 11 and 12 is the clear text logistical header node 426 enabling functionality in addition to game play. In one example, an audit of the game file can be conducted without the auditor gaining access to the sensitive win/lose information. In another example, the clear text header node 426 can be linked to another record file. One preferred example would be to link the clear text header node 426 to the consumer's personalized record file at the time of purchase and prior to decryption. This linking would allow the Internet gaming system to irrevocably associate the game play to the individual that purchased the game play; consequently the problem of ownership is completely resolved.

This auditable link of ownership of game play is significant since in the traditional brick and mortar lottery marketplace, pay on demand ticket ownership has proven to be a vexing problem throughout decades and it is generally perceived (and probably is true) that stealing a play record over the Internet will be more difficult to detect than in the brick and mortar lottery world (e.g., no physical signature on the back of the ticket). However, with linking the clear text header file of a game play to the consumer's personalized record file, ownership of a particular game play becomes tied to an individual, with any winning proceeds credited to their account. Thereby, digitally stealing a sold game play would be of no tangible value to the thief.

This not to imply that the only method of linking an individual to a particular game play is to link the clear text header 426 to an individual's account. There are multiplicities of methods to achieve this same end, such as adding the individual's account number to the clear text header 426 after purchase and prior to decryption, with some of these methods being more desirable under some circumstances. For example, in an alternative embodiment, the individual consumer identification account number may be appended to a separate database column as the game play script records on the game outcome generator 110 of FIGS. 1, 2, 6, and 10 and not necessarily to the actual game record 425 of FIGS. 11 and 12.

In any embodiment, scripts can originate in game programming 308 (FIGS. 6 and 10) and be transferred to the game outcome generator 110 in the Internet gaming site 100. The scripts can be algorithmically linked to the validation code 251 (FIG. 3) indicia printed on the tickets or vouchers 250, or displayed on a mobile device as a virtual ticket, or independent of any ticket or voucher. The significant point being the pre-generation of scripts enables auditing by third parties or separate algorithms under the security and supervision of the lottery service provider's game programming department 308 (FIGS. 6 and 10). One advantage is that the entire population of plays on the Internet gaming site 100 can be logged and audited to confirm to a predefined prize structure—e.g., 275 (FIG. 5). Additionally, since in this embodiment the significant (i.e., winning) portions of game plays are controlled by the scripts developed by the lottery service provider's game programming department 308 (FIGS. 6 and 10) and the scripts are algorithmically linked to the validation codes (e.g., 430 of FIG. 11), a reproducible audit trial of animated game play is available for any disputes between the customer and the lottery. In such disputes, the customer may claim that at one time their computer or portable device displayed a higher winning amount than they were actually credited. However, by simply accessing the script file 425 (FIGS. 11 and 12) associated with a given validation code 428, a customer service representative can explain what the customer observed on their screen in a step-by-step format helping to resolve the complaint without the need for further action. On the rare occasion where the consumer claims legal action or threatens media coverage of their contested inequitable game play, the associated script 425 can then be presented as the only tangible evidence of what actually did take place, helping to eliminate erroneous or bad faith arguments.

Figure 15:
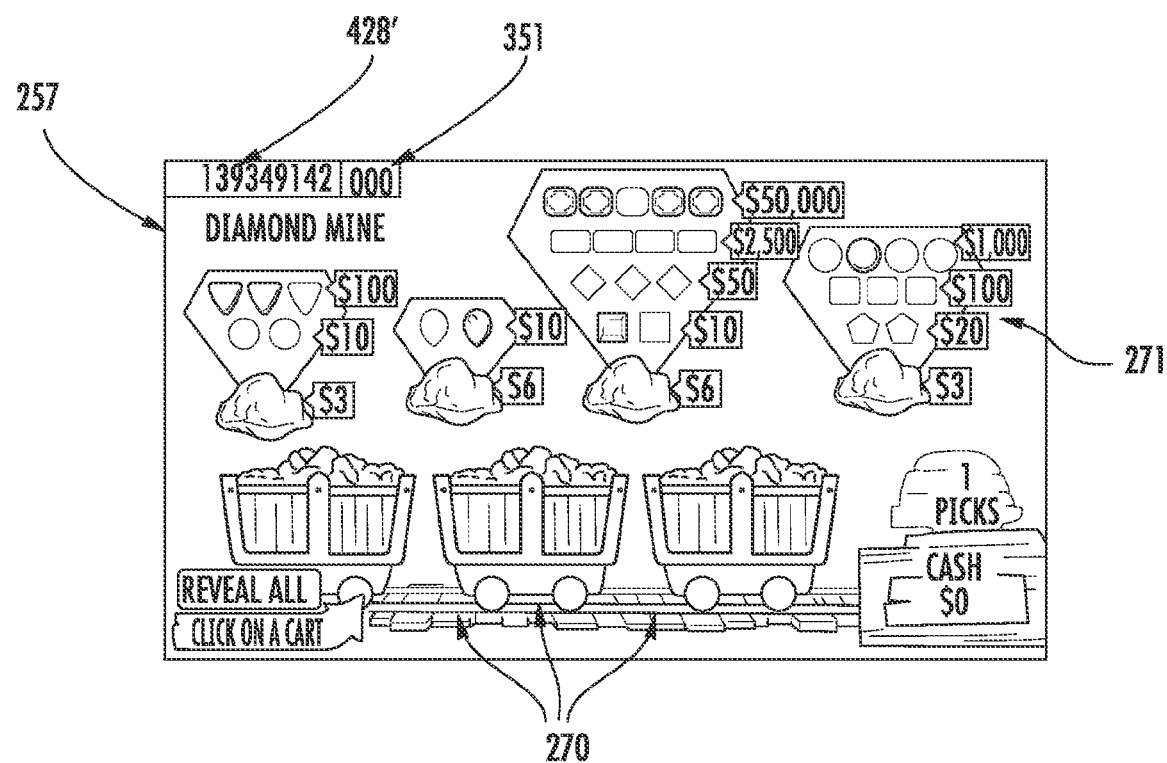
FIG. 15 is a front plan view of one of the representative examples of Internet lottery games of FIG. 4 with a validation code displayed on the screen of play that was enabled by the lottery instant ticket of FIG. 3.

As illustrated in FIG. 15, this auditability/traceability of linking a script file algorithmically can be extended to the actual play experience. In the figure, one of the games 257 (Diamond Mine) of FIG. 4 is illustrated with its enabling script code or validation number 428' (FIG. 15) shown on the playing screen that was extracted from the validation number 428 in the associated game script 425 of FIG. 12. While this enabling script code/validation number 428' may be irrelevant to the consumer, its presence aids audits.

If a consumer contacts a help center, the center can request the consumer to recite or enter the number displayed on the screen (i.e., 428'—FIG. 15), thereby proving the link to a given script 428 validation number (FIGS. 11 and 12) and associated final outcome. If the consumer states that the screen is no longer displayed, the help center can instruct the consumer to use the history portion of their browser or application to redisplay previous play screens. The redisplaying of screens can help the consumer to see previous plays and hopefully resolve any confusion. By always including the enabling script code or validation number 428' (FIG. 15), the danger of the consumer accidentally confusing another game with the contested game are virtually eliminated—e.g., the help center can request that the consumer read the enabling script code or validation number 428' when the play screen is recalled from history.

In addition to honest disputes, the enabling script code or validation number 428' displayed on the play screen can also be utilized to resolve fraudulent attempts by the consumer to alter the play screen display—e.g., with Photoshop or other means. Since the script code or validation number 428' is linked to the game play script file 425 (that controls outcome) via validation number 428/428' (FIGS. 11, 12, and 15), any falsely altered screen would either carry the original script code or validation number 428' (FIG. 15) from a game that would not agree with the erroneously altered screen. In the event the consumer in a fraudulent attempt altered the script code or validation number 428' to some new value, the altered number would almost certainly not match anything in the game outcome generator script 425 (FIGS. 11 and 12).

To aid in a multiple screen audit, the script code or validation number 428' (FIG. 15) could also include a sub-counter 351 that increments with each scene or play advancement. Thus, when the consumer recalled a certain screen, the associated sub-counter 351 should have incremented appropriately. While for most purposes a fixed counting increment (e.g., 1, 2, 3 . . . ) would suffice, security could be further enhanced by having the sub-counter 351 increment in an algorithmic manner that is virtually impossible for a human to predict—e.g., keyed hash chain based on previous screen script code or validation number 425' and sub-counter 351.

Figure 16:
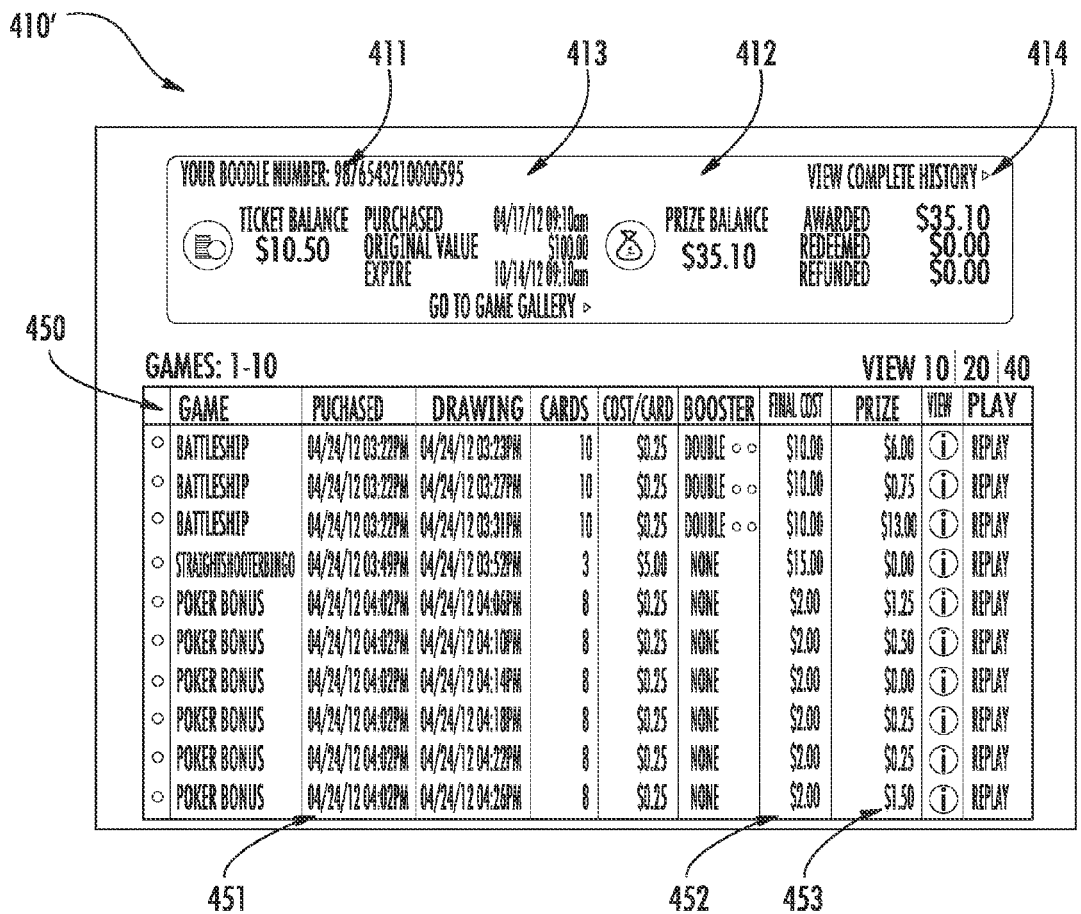
FIG. 16 is a front plan view of a representative example of wagering and winning account totals that were enabled by the financing system of FIG. 7.

The audit history can be extended to the overall consumer's account, thus providing the consumer with a history of game play. FIG. 16 provides an example of one such embodiment. As in FIG. 7, the balances of the closed loop wagering 322 and winning accounts 323 are illustrated separately under different pseudonyms (i.e., Ticket Balance for 322' and Prize Balance for 323') that convey a more straightforward message to the consumer. However, on the audit history screen there are rows 450 designating the history of each game played by the consumer. In each row are summary information such as the time and date of when the game was purchased and played 451, the cost of the game itself 452, as well as whether or not any prizes were won 453.

In the previous embodiments, the game scripts 425 of FIGS. 11 and 12 provided predetermined outcomes with the associated audit trials linking the predetermined outcomes to an individual consumer. However, this is not to imply that game scripts are limited to games with predetermined outcomes, the same concept can be applied to games with outcomes determined by Random Number Generators (RNGs), or a combination of RNG and skill (e.g., Poker), or social games involving multiple players.

Figure 17:
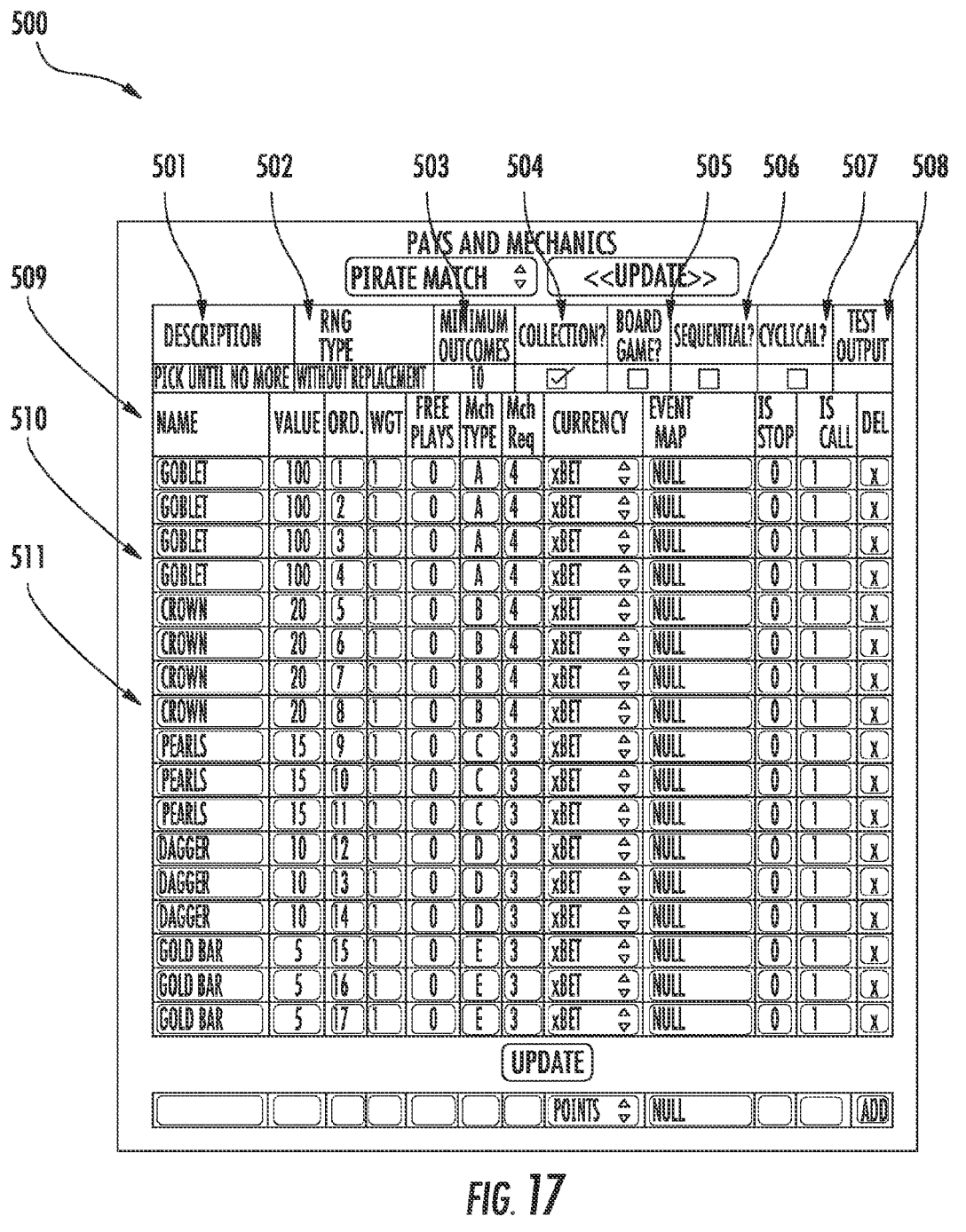

For example, FIG. 17 illustrates a user programming interface 500 to create a RNG driven gaming script that would alternatively enable game screens 450 and 450' of FIG. 13. In this embodiment, the same Pirate Match game 450 and 450' would behave in essentially the same manner as before, however now the outcome and associated win/lose status is undetermined at the time of purchase with a RNG (resident in the game outcome generator 110 of FIGS. 1, 2, 6, and 10) determining the outcome after the purchase is made in compliance with the game script instructions. Thus, in this embodiment, the game script establishes the dynamics of game play as well as the odds with the actual outcome being driven by the output of the RNG. In other words, these RNG outcome game scripts have defined formats and structure including a definition of odds, but the actual outcome is not embedded in the script. For the most part, the consumer would not know the difference between games enabled by predetermined scripts or RNG enabled scripts (e.g., the Pirate Match game screens 450 and 450' of FIG. 13 play virtually identical with either embodiment), however some game types (e.g., skilled based like poker with multiple human players, Keno, etc.) lend themselves to RNG enabled outcomes.

By providing RNG enabled scripts, most of the advantages of the predetermined game scripts can be utilized in RNG based games. For example, linking a given game script to an individual player at the time of sale can be implemented with RNG enabled scripts as readily as predetermined scripts. Additionally, the specific output of the RNG determining the outcome or play of the game can also be linked to the script, thereby creating a full audit trail of game play as well as the performance of the RNG itself, as well as reducing the reliance on trusted or certified services (e.g., Szrek2Solutions Trusted Draw™ and Trusted Play™ operating under patent U.S. Pat. No. 6,934,846) as the primary assurance of the fairness or randomness of the RNG. Furthermore, RNG scripts readily enable altering the odds of a game's outcome via either internal (i.e., contained within the script itself) or external parameters. This varying of odds from one game play to the next can be employed to ensure that the overall payout remains within predefined (e.g., legal) limits in cases of payout drift due to either random events, or player skill, or other actions.

Returning to the programming interface 500 of FIG. 17, which is used to create RNG driven gaming scripts, in this embodiment the interface 500 includes a generic programming header (501 thru 507) providing the parameter settings used to specify any type of RNG Internet game that would be implemented. Specifically, the Description 501 column provides a human readable reference description of the game play style (e.g., "pick until no more" for the Pirate Match game). The RNG Type 502 column selects the type of RNG employed in the game from a multiplicity of predefined types (e.g., "without replacement" for the Pirate Match game). The Minimum Outcomes 503 column specifies the minimum number of outcomes for the game (e.g., "10" for the Pirate Match game). The Collection 504 column provides a check box to inform the script generator that the game is played by collecting indicia (e.g., activated for the Pirate Match game). The Board Game 505 column provides a check box to inform the script generator that the game is board based (e.g., not activated for the Pirate Match game). The Sequential 506 column provides a check box to inform the script generator that the game requires sequential play (e.g., not activated for the Pirate Match game). The Cyclical 507 column provides a check box to inform the script generator that the game features sequential play style (e.g., not activated for the Pirate Match game). In addition to the previous generic RNG game script column headers (501 thru 507), the header row also includes a Test Output 508 column with a clickable Test Project virtual button. As its name implies, Test Output 508 column allows the game script to be viewed and tested by a human before being deployed in an actual gaming environment.

Once the generic parameters (501 thru 507) have been configured, a game specific matrix is generated with its own header 509 allowing the human game designer to set critical indicia specific parameters for the game (e.g., value, weight, automatic free play, etc.) being implemented. Each row within the game specific matrix allows for the game designer to specify the critical characteristics of a given indicia. For example, row 510 specifies the characteristics of a specific type (i.e., $4^{th}$ in the order) of indicia (Goblet with a value of 100), while row 511 specifies a crown indicia, with a value of 20 both ultimately would appear on the Pirate Match game play screen 450' of FIG. 13.

After the candidate RNG game script was configured and tested, the programming interface 500 would then facilitate automatic generation of a game script file similar to 425 of FIGS. 11 and 12. It should be noted that it may still be desirable for the sensitive data of the RNG game script to be stored as cipher text as in 429 of FIG. 11 even though a RNG generator ultimately determines the final outcome after the sale of the game—e.g., on some games it may be desirable to vary the winning odds from play to play, or force (i.e., not selected by a RNG) high tier winners for ease of audit, etc. Whether the sensitive data is partially encrypted or not, the produced RNG game script would still resemble the clear text version illustrated in 429' of FIG. 12. The primary difference being, the clear text version of the produced RNG game script would execute in conjunction with the RNG output to determine the outcome of a particular game play.

The advantages of using game programming interface 500 to generate RNG based game scripts are numerous, including allowing less technically inclined individuals to design and implement games (including potential lottery customers), forcing game descriptions into predefined structures thereby simplifying associated specifications and payout calculations, easier audit trials, etc.

Whether predetermined or RNG game scripts, it may be desirable to modify the payouts or winning frequency of game scripts after they are loaded onto the game outcome generator 110 of FIGS. 1, 2, 6, and 10 and available for purchase. For example, skill or social based games wherein player activity influences the actual game payout in a substantial manner may cause the actual payout to deviate substantially from the Expected Value (EV). However, for security and auditability reasons, the validation system typically prohibits modifying game play scripts or validation files after they are loaded on the game outcome generator 110. Thus, to accommodate both the potential need to modify the payout/frequency-of-win of games already loaded on the game outcome generator 110 with security, it may be desirable to embed one or more pointers in the game script to variables in another (editable) restructured database. These external variables could include numerical weighting factors, which could impact multiple parameters—e.g., allowing the win/lose status of the RNG to remain unmodified yet have the weighting influence the payout, only modifying the win/lose status of a session, etc. In any case, since the pointers in the game script point to external database variables, the original game script can remain unmodified and thereby easily verified. For both authentication and integrity reasons, it may be desirable for the external database to be stored as cipher text. In this embodiment, it also maybe desirable for the external database to be encrypted with a multiplicity of keys—e.g., each game play script variable database is encrypted with a unique key stored in the cipher text portion 429 (FIG. 11) of the game play script 425.

In addition to implementation of actual gaming on the Internet, there are problems associated with the traditional lottery retailer brick and mortar base retailers realizing a reduction in sales due to the introduction of Internet gaming. Additionally, while traditional lottery games have been successful over the years with prize funds (i.e., percentage of money received paid out as prizes) of typically 50% for draw games (e.g., Pick 3, Pick 4, Powerball, etc.) and 65% for instant tickets, there is substantial evidence that these relatively low prize funds will hamper sales when applied to Internet play. For example, it is widely known that Nevada law mandates that the minimum average payout or prize fund for a casino slot machine can be no less than 80%, yet most Las Vegas casinos have their slot machines set for average payouts between 90% to 95%. The reason for the 10% to 15% higher payout than required by law is due to the fact that casinos realize higher revenue from the higher payout because of massive increases in play volume. Thus, in environments with a high frequency of play and visual feedback (i.e., slot machines), higher revenue for the casino is realized with higher payouts with the apparent optimum payout point for casino revenue ranging between 90% and 95%. While lotteries have enjoyed relatively high revenue in the past with their brick and mortar sales venues of draw games and instant tickets, it can be argued that the increased frequency of play of Internet games (i.e., seconds for some Internet games versus minutes or days for traditional lottery games) will drive the Internet gaming systems to higher payouts. However, most state laws dictate that the payout or prize fund must be set around 65% for Internet play. Therefore, a potential Internet sales problem may arise after consumers realize the relatively meager prize funds associated with Internet games versus their casino counterparts.

Fortunately, both traditional retailers' concerns about losing sales to the Internet as well as a reduced prize fund can be helped by enhancing Internet gaming payouts. It should be understood, that in this context, "enhancing Internet payouts" does not mean increasing the prize fund as a percentage of sales, rather in this context enhancing Internet payouts includes both adding abstract prizes as well as cumulative prize pools.

By offering coupons or closed loop gift cards from participating local or national retailers to Internet gaming prizes, the prize fund has the perception of increasing in value, while in reality the same percentage (e.g., 65%) of actual sales is still allocated to prizes. With retailer discounts awarded as prizes, participating national and local retailers would award the predetermined discount award at the time of an appropriate purchase. The discounts can take the form of a percentage, a fixed refund, or some service provided at no extra charge—e.g., 5% off of a purchase at a retail store, $1 refunded off of two items at a restaurant, free shipping at Amazon.com, etc.

Marketing wise, retailer discounts are desirable for all parties because retailers readily offer discounts to new customers—with the increase in traffic at their establishments more than offsetting the cost of the discount. However, while retailers applaud discounts to new customers, the traditional problem has always been how to attract new customers without reducing profit margins from existing customers. For example, advertising campaigns touting special deals or discounts typically cost the retailer a multiple of the actual discount itself (e.g., advertising costs, distribution costs, etc.) with there always being the possibility that only regular customers end up using the discount. Therefore, so long as the retailer has a reasonable assurance that the discount brings in new business, he or she will gladly offer a discount.

By offering discounts as prizes, the Internet gaming system is uniquely positioned to provide assurance to retailers that their added traffic is truly additional business. Since only lottery consumers would receive the prize discounts, the retailer can essentially market directly to the lottery's player base (a group that he or she may see only a portion of) while essentially only paying discounts for actual sales. At the same time, the lottery benefits by creating an environment where its players can leverage discounts as part of game play benefits both the lottery and its players—truly a winning proposition for all parties.

The physical embodiment of Internet gaming discounts could be in the form of a barcoded coupon received by the consumer at the end of the game. This coupon could be printed on paper and presented to the retailer or sent to the consumer's mobile device in the form of a visual barcode or other data that would interact with the retailer's Point Of Sale (POS) equipment. Alternatively, the discount could be registered at a central site and associated with the consumer's account, when the consumer presented the account at a participating retailer, the central site system would coordinate the awarded discount to the retailer's POS equipment. Still, another alternative would be for the Internet gaming sponsored GPR card 324 (FIG. 7) assigned as part of the consumer's gaming account 321 to be linked to the consumer's account number. Thus, when the consumer visited the participating retailer establishment, he or she would simply use their Internet lottery GPR card 324 for the purchase and automatically receive a discount using the debit/credit interchange.

In addition to discounts, Internet games can be designed with a scavenger hunt type feature—i.e., where the consumer is required to physically visit a specific location to garner a prize or elevate the game being played to the next level. Like coupons, the scavenger hunt feature could be financed (and thereby adding funds to the prize fund) through participating retailers. Again, retailers will pay a small fee to new customers in the form of a discount or other service especially if the retailer is confident the customers being paid for are new. With the scavenger hunt embodiment, the retailer is using the Internet game to effectively channel Internet gaming consumers through the retailer's establishment.

Like the discounts embodiment, the physical embodiment of Internet gaming scavenger hunt type feature could be in the form of a code or data the consumer records while visiting the retailer's establishment. For convince and to drive traffic directly to the POS equipment, the code could be handed out as a preprinted or real time printed ticket upon request. Alternatively, the consumer's mobile device could scan a barcode on display at the retailer's establishment or otherwise interact with the retailer's POS equipment. Another alternative embodiment would be when the consumer presented their Internet gaming account at a participating retailer, the central site system would coordinate the action to the retailer's POS equipment. Yet another alternative would be for the Internet gaming sponsored GPR card 324 assigned as part of the consumer's gaming account 321 to be linked to the consumer's account number. Thus, when the consumer visited the participating retailer establishment, he or she would simply use their Internet lottery GPR card 324 to authenticate completing the scavenger hunt task. In any case, the scavenger hunt embodiment could be configured where the retailer only paid a fee for the consumer's that actually visited their establishment, thereby increasing the value to the retailer of the endorsement.

In addition to brick and mortar retailer related coupons and scavenger hunts, there remains the embodiment of increasing perceived payout value with deferred games that require an accumulation of credits or other mechanisms amassed by playing multiple Internet lottery games. Strictly speaking, the deferred game embodiment does not actually increase the value of the prize fund, rather deferred games increase the perceived value of the gaming experience by simultaneously extending the length of play and imparting the hope of a future winning experience even after losing a game.

Figure 18:
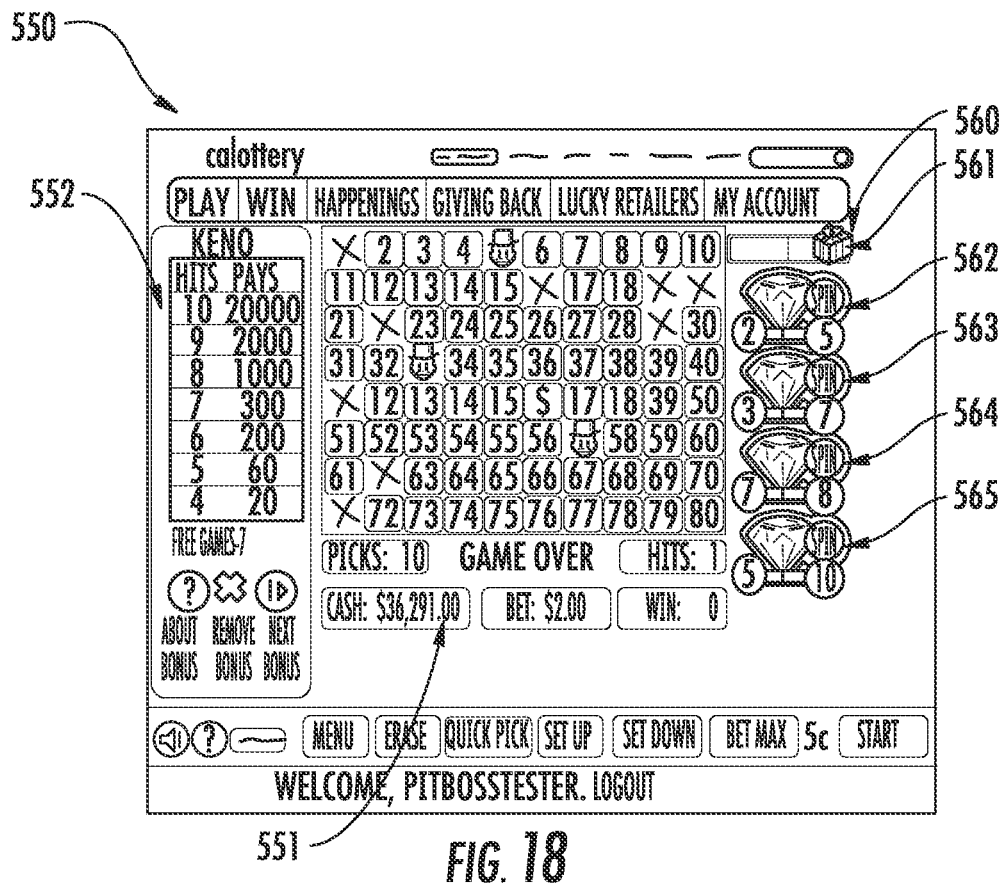
FIG. 18 is a front plan view of a representative example of a deferred game totalizing screen; and, FIG. 19 is a front plan view of two representative examples of deferred games that were enabled by the totalizing screen of FIG. 18.

For example, FIG. 18 shows a combined play screen 550 for a Keno game 551 with an integrated deferred game totalizer 560. This particular Keno play screen 551 illustrates a losing game experience because the minimum number of Keno matches (i.e., four as illustrated in pay table 552) was not achieved. However, the combined play screen 550 also includes space for a deferred game totalizer 560. This deferred game totalizer 560 provides the consumer with constant updates on how close he or she is to qualifying for a deferred game. Totalizer 560 illustrates five different deferred games (i.e., 561 thru 565) that the consumer has been acquiring credits for over the course of game play; specifically: a bonus present 561 with an 100% chance of receiving after accumulating the required number of credits, a Diamond Wheel 562 spin offering a small chance of winning a large prize (e.g., $1,000), a Ruby Wheel 563 spin offering slightly better odds for a medium to large prize, an Emerald Wheel 564 spin offering better odds for a medium sized prize, and a Sapphire Wheel 565 spin with still better odds for low tier prizes. Thus, the multiplicity of totalizer games that automatically accumulates through regular game play help to entice the consumer to continue even after a losing game experience such as Keno game 551.

In the totalizer example 560 of FIG. 18, the five different deferred games (561 thru 565) can accumulate credits at different rates, with the cost of the prize fund to play the deferred game (i.e., spin the wheel or pay the gift) determining the rate of credit accumulation. For example, the Diamond Wheel 562 deferred game having a higher potential payout than the Sapphire Wheel 565 would accumulate credits at a much slower rate. Alternatively, all deferred game wheels could accumulate credits at equal rates, with the odds of paying a prize varying from wheel to wheel. In any case, the concept of having the deferred game totalizer 560 visible to the consumer during regular game play functions as a reminder and enticement for continued play.

Figure 19:
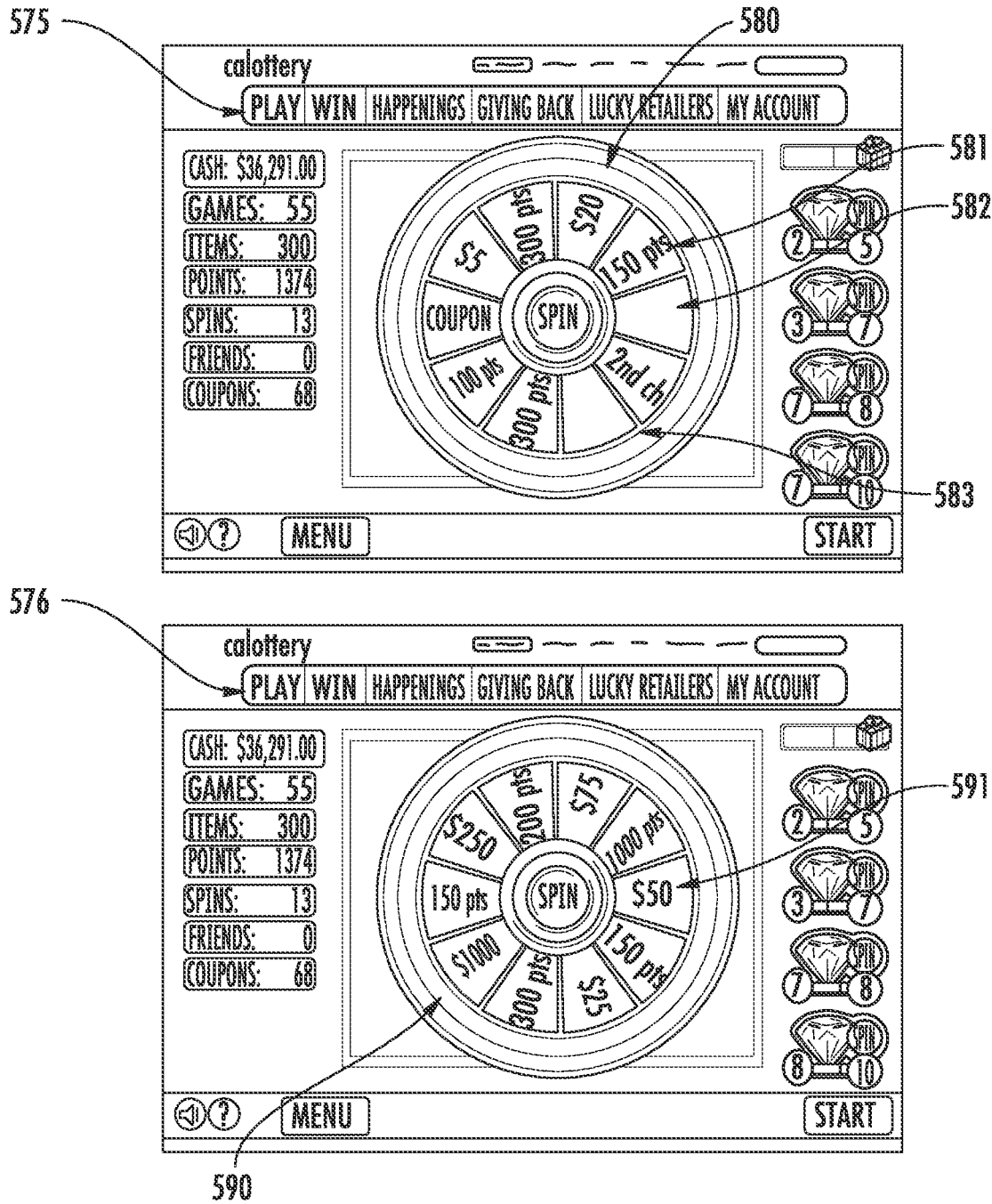

When a consumer has accumulated enough credits to play a deferred game, they can actuate the desired game at any time by clicking on the associated indicia in the deferred game totalizer 560—e.g., 564 for the Emerald Wheel deferred game. Once actuated and assuming sufficient credits were amassed to enable play, the play screen would change to the chosen deferred game. For illustration, FIG. 19 illustrates two possible deferred game screens, an Emerald Wheel screen 575 and a Diamond Wheel screen 576. While the play action of the two wheels 575 and 576 is identical (i.e., a carnival type spinning wheel), the value of the potential prizes offered differs. For example, the Emerald Wheel 575 features a top cash prize of only $20 (580) with numerous additional point prizes (e.g., 581) as well as chances to spin higher tiered wheels—e.g., the Ruby Wheel spin award 582 and the Diamond Wheel spin award 583. In contrast the Diamond Wheel 576 features a top prize of $1,000 (590) along with mid-tier cash prizes (e.g., $50—591) and points awards.

Additionally, with either the Emerald 575 or Diamond 576 Wheels, the actual odds of winning a given prize can vary depending on the weighting of each prize assigned—e.g., the $1,000 top prize 590 in the Diamond Wheel may have odds far less than the one out of ten that the wheel imagery implies. This weighing can be adjusted to allow a higher frequency chance for the consumer to experience a high tier deferred game without significantly debiting the prize fund.

The deferred game embodiment can be implemented with either predetermined or RNG enabled deferred game scripts, providing an embodiment that has all of the security and auditability advantages of gaming scripts as previously disclosed. This is not to imply that the deferred game embodiment can only be implemented with gaming scripts. In an alternative embodiment, a simple RNG algorithm could be triggered allowing for any different weighting assigned to different prizes.

In either the game script or simple RNG algorithm embodiments, the odds of winning or earning a chance at a deferred game can be fluid. In this embodiment, the odds of winning all differed game prizes or a specific prize can be allowed to change dynamically to balance actualized game play payouts to the theoretical EV.

The deferred game wheel embodiments are only one possible embodiment of the deferred game concept. The wheel embodiment was mainly chosen for teaching purposes since the overall win/lose concept is relatively straightforward. Indeed, in practice the deferred game concept can be applied to practically any form of Internet game.

What is claimed is:

1. An internet gaming system, comprising:
a core platform having a hardware and software configuration to provide common functionalities to a plurality of different Internet-based games made available for play on an Internet game site;
a vertical extension functionality configured with said core platform, wherein core platform input/output data is transmitted through said vertical extension, said vertical extension comprising a first application programming interface;
a plurality of game specific modules, each said game specific module having a hardware and software configuration to conduct at least one of the different respective games with players via the Internet game site, said game specific modules including a dedicated second application programming interface, wherein input/output data between said core platform and said game specific modules occurs only through said first and second application programming interfaces in said vertical extension;
a secure game outcome generator having a hardware and software configuration to determine a game outcome for each game played via said system, said secure game outcome generator linked to said core platform via a secure interface with said vertical extension that is separate from said first and second application programming interfaces, wherein said secure game outcome generator is not accessible by said game specific module through said vertical extension;
wherein said game specific modules operate on a physically separate server from said core platform; and
further comprising a firewall operatively configured between said first and second application programming interfaces.

2. The internet gaming system as in claim 1, wherein said game specific modules are provided by different game developers, said second application programming interface being generic to said game specific modules from different developers.

3. The internet gaming system as in claim 1, wherein said core platform comprises generic functionality components for all games provided by said system, including an electronic commerce functionality component, a customer relationship management functionality component, and a player history/archive functionality component.

4. The internet gaming system as in claim 3, wherein said electronic commerce functionality component is linked to an external banking system via a secure firewall.

5. The internet gaming system as in claim 1, wherein each of said game specific modules comprises a game engine that executes all logic functions for play of the specific game, and a presentation/resources component that controls audio and visual display of the game to the player.

6. The internet gaming system as in claim 5, wherein said presentation/resources component is updateable to change appearance of the game presented to the player.

7. The internet gaming system as in claim 1, wherein said secure game outcome generator operates on a physically separate server from said core platform.

8. The Internet gaming system as in claim 7, further comprising a firewall operatively configured between said vertical extension and said secure game outcome generator.

9. The Internet gaming system as in claim 8, wherein said secure game outcome generator comprises an interface separate from said vertical extension wherein game specific outcome files are loaded into said secure game outcome generator for each game specific module.

10. The internet gaming system as in claim 9, wherein each game specific outcome file comprises a validation file for each game play enabled by a respective said game specific module, wherein the number of winners and losers for the totality of game plays enabled by said game specific module is predetermined by the validation files.

11. The internet gaming system as in claim 10, wherein the validation files are linked to respective game plays by a code entered by a player upon initiating play of the game via the Internet, wherein the code is received by said game module and passed through the first and second application programming interfaces of said vertical extension to said core platform, wherein said core platform relays said code to said game outcome generator.

12. The internet gaming system as in claim 11, wherein said game outcome generator relays a predetermined game result dictated by the linked validation file back through said core platform and said first and second application programming interfaces to said game specific module.

13. The internet gaming system as in claim 12, wherein a plurality of different themed games are enabled by said game specific module and selectable for play by a player, said plurality of different themed games sharing a common prize structure such that the predetermined game result is applicable to whichever game is selected for play by the player.

* * * * *